(12) United States Patent
Basko et al.

(10) Patent No.: US 6,993,529 B1
(45) Date of Patent: Jan. 31, 2006

(54) IMPORTING DATA USING METADATA

(75) Inventors: Roman Basko, Newcastle, WA (US); Sri Krishna Nakka, Bellevue, WA (US); Jay Sauls, Woodinville, WA (US); Radha Krishna Uppala, Redmond, WA (US)

(73) Assignee: Revenue Science, Inc., Bellevue, WA (US)

( * ) Notice: Subject to any disclaimer, the term of this patent is extended or adjusted under 35 U.S.C. 154(b) by 611 days.

(21) Appl. No.: 09/872,867

(22) Filed: Jun. 1, 2001

(51) Int. Cl.
*G06F 17/30* (2006.01)
(52) U.S. Cl. .......................... 707/100; 707/101; 707/6
(58) Field of Classification Search ................... 707/7, 707/101, 203, 100, 6; 715/848
See application file for complete search history.

(56) References Cited

U.S. PATENT DOCUMENTS 5,767,854 A * 6/1998 Anwar ...................... 715/848

\* cited by examiner

*Primary Examiner*—Jeffrey Gaffin
*Assistant Examiner*—Neveen Abel-Jalil
(74) *Attorney, Agent, or Firm*—Perkins Coie LLP

(57) ABSTRACT

A method and system for importing data into a data store in accordance with metadata. The import system provides metadata that specifies how the import data for various types of import sources is to be imported into the data store. The import sources may be categorized according to the type of data provided by the import sources. When the import system receives the import data from the import source, it identifies the type of import source and retrieves the metadata defined for that type of import source. The import system then imports the received import data into the data store in accordance with the retrieved metadata.

8 Claims, 21 Drawing Sheets

*Fig. 14*

IMPORTING DATA USING METADATA

TECHNICAL FIELD

The described technology relates to importing data into a database.

BACKGROUND

The World Wide Web is conducive to conducting electronic commerce ("e-commerce"). E-commerce generally refers to commercial transactions that are at least partially conducted using the World Wide Web. For example, numerous web sites are available through which a user using a web browser can purchase items such as books, groceries, and software. A user of these web sites can browse through an electronic catalog of available items to select the items to be purchased. To purchase the items, a user typically adds the items to an electronic shopping cart and then electronically pays for the items in the shopping cart. The purchased items can then be delivered to the user via conventional distribution channels (e.g., an overnight courier) or via electronic delivery when, for example, software is being purchased. Many web sites are also informational rather than commercial in nature. For example, many standards organizations and governmental organizations have web sites with a primary purpose of distributing information. Also, some web sites (e.g., a search engine) provide information and derive revenue from advertisements that are displayed.

The success of any web-based business depends in large part on the number of users who visit the business's web site and that number depends in large part on the usefulness and ease-of-use of the web site. Web sites typically collect extensive information on how their users use the site's web pages. This information may include a complete history of each HTTP request received by and each HTTP response sent by the web site. The web site may store this information in a navigation file, also referred to as a log file or click stream file. By analyzing this navigation information, a web site operator may be able to identify trends in the access of the web pages and modify the web site to make it easier to navigate and more useful. Because the information is presented as a series of events that are not sorted in a useful way, many software tools are available to assist in this analysis. A web site operator would typically purchase such a tool and install it on one of the computers of the web site. There are several drawbacks with the use of such an approach of analyzing navigation information. First, the analysis often is given a low priority because the programmers are typically busy with the high priority task of maintaining the web site. Second, the tools that are available provide little more than standard reports relating to low-level navigation through a web site. Such reports are not very useful in helping a web site operator to visualize and discover high-level access trends. Recognition of these high-level access trends can help a web site operator to design the web site. Third, web sites are typically resource intensive, that is they use a lot of computing resources and may not have available resources to effectively analyze the navigation information.

It would also be useful to analyze the execution of computer programs other than web server programs. In particular, many types of computer programs generate events that are logged by the computer programs themselves or by other programs that receive the events. If a computer program does not generate explicit events, another program may be able to monitor the execution and generate events on behalf of that computer program. Regardless of how event data is collected, it may be important to analyze that data. For example, the developer of an operating system may want to track and analyze how the operating system is used so that the developer can focus resources on problems that are detected, optimize services that are frequently accessed, and so on. The operating system may generate a log file that contains entries for various types of events (e.g., invocation of a certain system call).

To overcome some of the drawbacks mentioned above, a hosted service may be provided that collects event information from various web sites, stores the information at a central location, and provides a web site through which web site operators can access and analyze the information collected from their web site. Because the format and organization of the data collected from different web sites may be very different, the hosted service provider may need to expend considerable effort to develop conversion programs to convert the collected information into a format that is compatible with the data warehouse of the hosted service. It would be desirable to reduce the effort needed to convert the collected information.

BRIEF DESCRIPTION OF THE DRAWINGS

FIG. 14 is a block diagram illustrating the generation of an aggregation and report table.

DETAILED DESCRIPTION

A method and system for importing data into a data store in accordance with metadata is provided. In one embodiment, the import system provides metadata that specifies how the import data for various types of import sources is to be imported into the data store. The import sources may be categorized according to the type of data provided by the import sources. For example, various web sites may provide similar types of data (e.g., click stream data) that may be categorized as the same type of import source. Alternatively, each company or organization may be categorized as its own type of import source. When the import system receives the import data from the import source, it identifies the type of import source and retrieves the metadata defined for that type of import source. The import system then imports the received import data into the data store in accordance with the retrieved metadata. The retrieved metadata may define a schema for the data store and define how the import data is to be stored in the data store. The schema may define the various tables for the data store. The schema may include for each table an indication of the properties (or columns) for that table. The import system creates the tables in accordance with the schema and then imports the import data into the created tables. The metadata may indicate, for each property of a table, how the value for that property is to be calculated from a field of the import data. In this way, metadata for the same type of import source can be shared by import sources of that type and the metadata can specify the schema of the data store. The use of metadata reduces the effort needed to import data into the data store.

Figure 1:
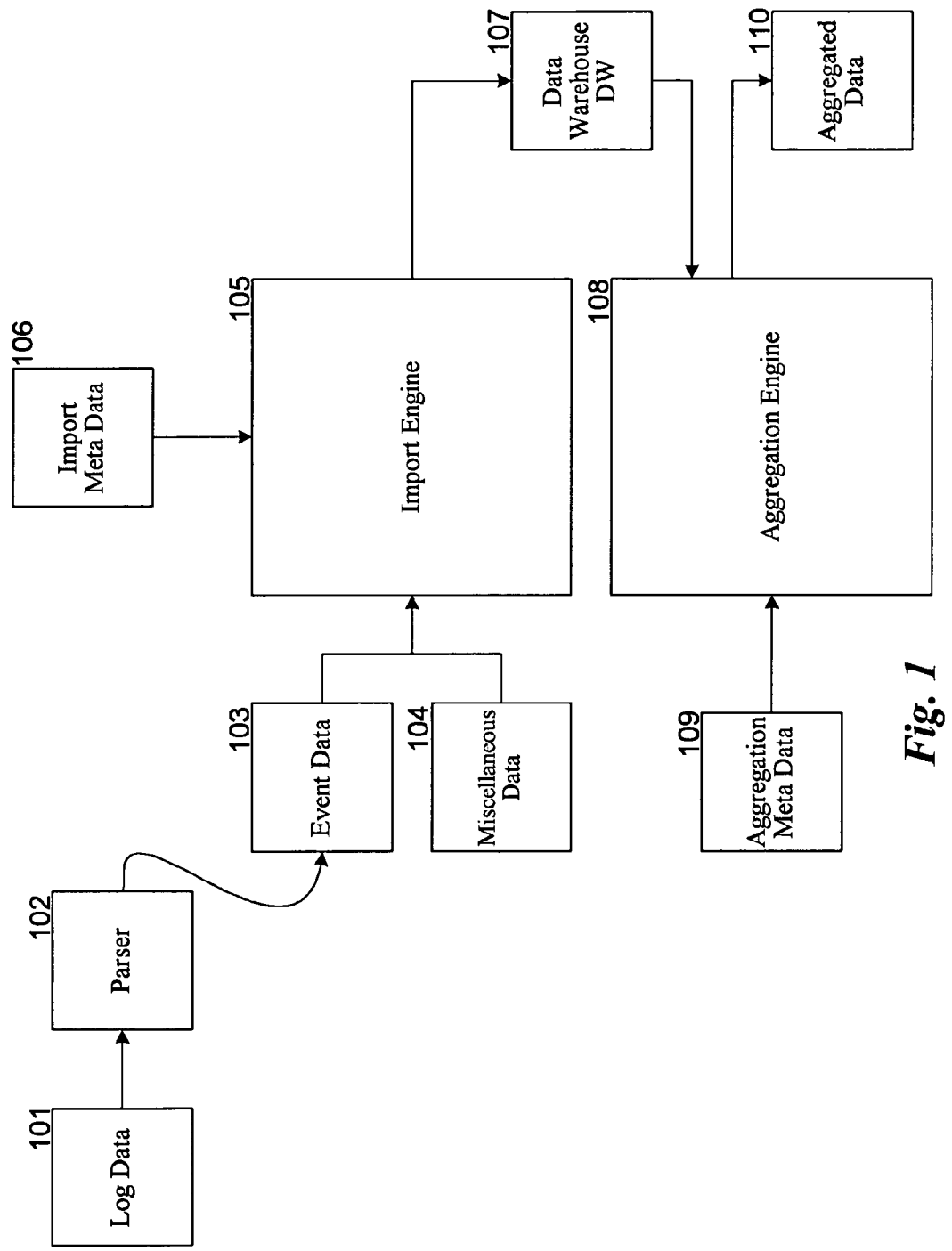
FIG. 1 is a block diagram illustrating the organization of the import system in one embodiment.

FIG. 1 is a block diagram illustrating the organization of the import system in one embodiment. In this embodiment, the import system includes log data 101, parser 102, event data 103, miscellaneous data 104, import engine 105, import metadata 106, data warehouse ("DW") 107 (i.e., a data store), aggregation engine 108, aggregation metadata 109, and aggregated data 110. The log data may represent a click stream file generated by a web server. The parser processes the log data and generates various types of event data. For example, event data may include the identification of the click stream associated with each visit of a user to the web server. U.S. patent application Ser. No. 09/613,847, entitled "Method and System for Parsing Navigation Information," which is hereby incorporated by reference, describes a parser. The miscellaneous data may include information on products available to be purchased by users via the web server and the identification of registered users of the web server. The import metadata describes how the event and miscellaneous data, referred to collectively as "import data," are to be imported by the import engine and stored in the data warehouse. The import metadata not only defines how the import data is to be transformed, but also defines the structure of the tables of the data warehouse in which the import data is to be stored. The aggregation metadata defines how the data in the data warehouse is to be aggregated. The aggregation engine inputs the aggregation metadata, aggregates the data of the data warehouse in accordance with the aggregation metadata, and stores the aggregated data. One skilled in the art would appreciate that the aggregated data may be stored in the data warehouse itself. The import system may execute on a computer system that includes main memory, a central processing unit, input devices (e.g., keyboard and pointing devices), output devices (e.g., display devices), and a hard drive. The main memory and hard drive are computer-readable media that may contain instructions that implement the import system. The import data may receive data from various communication channels that includes the Internet, a wide area network, a point-to-point dial-up connection, or a local area network.

Figure 2:
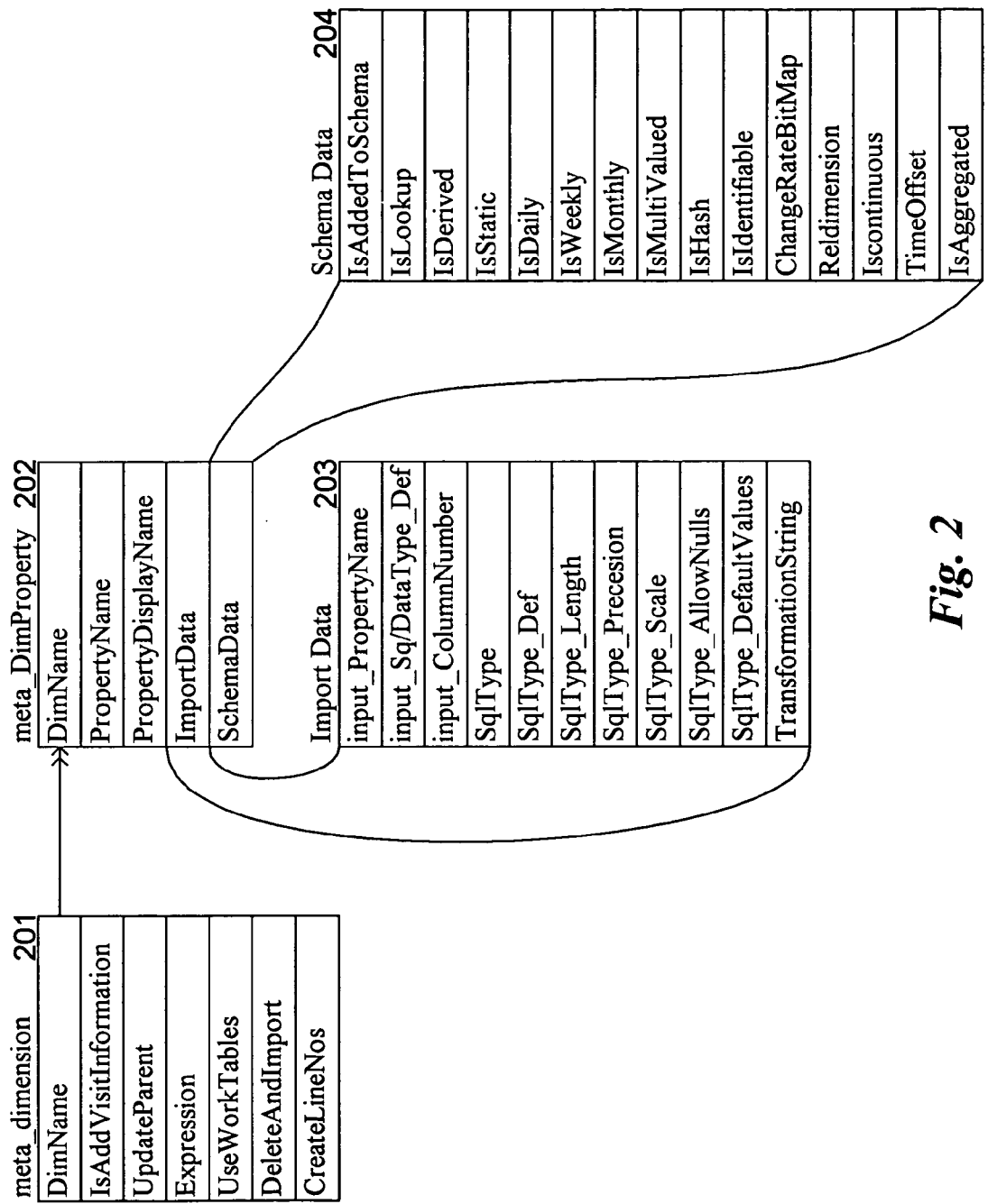
FIG. 2 is a block diagram illustrating the structure of the import metadata.

FIG. 2 is a block diagram illustrating the structure of the import metadata. The import metadata is stored in a meta_Dimension table 201 and a meta_DimProperty table 202. The meta_Dimension table contains an entry for each table of the data warehouse into which data is to be imported. The meta_DimProperty table contains an entry for each column or property of each table specified by the meta_Dimension table. Each entry of the meta_DimProperty table contains import data 203 and schema data 204. Tables 1–4 describe the contents of the meta_Dimension table and the meta_DimProperty table.

The meta_Dimension table contains an entry for each table of the data warehouse into which data is to be imported.

| meta_Dimension | |
|---|---|
| AttributeName | Description |
| DimName | Name of the table of the data warehouse |
| IsAddVisitInformation | Indicates that visit identification information is to be added to this table ("this" table refers to the table of the data warehouse described by this entry in the meta_Dimension table) |
| UpdateParent | Name of the parent table of this table to be updated |
| Expression | Code that indicates how the parent table is to be updated |
| UseWorktables | Indicates whether the import data for this table should be stored in a temporary table before being moved to this table in the data warehouse |
| DeleteAndImport | Indicates that all rows of this table in the data warehouse with the same identifier as a row to be imported are to be deleted before the row is imported |
| CreateLineNos | Indicates that line number data is to be added the rows of this table |

The meta_DimProperty table contains an entry for each column of each table in the data warehouse. The combination of the DimName and PropertyName attributes uniquely identifies the entries of this table.

| meta_DimProperty | |
|---|---|
| AttributeName | Description |
| DimName | Name of this table in the data warehouse (corresponds to the DimName attribute of the meta_Dimension table) |
| PropertyName | Name of this column of this table in the data warehouse |
| PropertyDisplayName | Display name of this column |
| ImportData | see meta_DimProperty (import data) |
| SchemaData | see meta_DimProperty (schema data) |

The import data attributes of the meta_DimProperty table describes the data to be imported.

| meta_DimProperty (import data) | |
| --- | --- |
| AttributeName | Description |
| input_PropertyName | Name of column of import data corresponding to this column |
| input_SqlDataType_Def | Type of data in this column of the import data (e.g., integer) |
| input_ColumnNumber | Column number of this column in the import data |
| SqlType | Specifies the SQL type of this column |
| SqlType_Def | Specifies the SQL type definition of this column |
| SqlType_Length | Specifies the SQL type length of this column |
| SqlType_Precision | Specifies the SQL type precision of this column |
| SqlType_Scale | Specifies the SQL type scale of this column |
| SqlType_AllowNulls | Specifies whether nulls are allowed for the SQL type of this column |
| SqlType_DefaultValues | Specifies default values for the SQL type of this column |
| TransformationString | Code to transform the import data for this column |

The schema data attributes of the meta_DimProperty table describe how to store the import data in this column in this table.

| meta_DimProperty (schema data) | |
| --- | --- |
| AttributeName | Description |
| IsAddedToSchema | Indicates whether this column has already be added to this table in the data warehouse |
| IsLookup | Indicates whether a lookup table should be created for this column |
| IsDerived | Indicates whether the TransformationString attribute should be used to transform the import data for this column |
| IsStatic | Indicates whether the history of this column should be tracked |
| IsDaily | Indicates whether this column is to be aggregated on a daily basis |
| IsWeekly | Indicates whether this column is to be aggregated on a weekly basis |
| IsMonthly | Indicates whether this column is to be aggregated on a monthly basis |
| IsMultiValued | Indicates whether this column contains an array |
| IsAggregated | Indicates whether this column is to be aggregated |
| IsHash | Indicates whether this column should be included in a hash value to determine whether a row of this table has changed |
| IsIdentifiable | Indicates whether this column is part of the unique identifier for this table |
| ChangeRateBitMap | Combination of the IsDaily, IsWeekly, and IsMonthly attributes |
| Reldimension | Indicates the table of the data warehouse that contains dimension data for this column (i.e., the related dimension table) |
| IsContinuous | Indicates whether the data of this column should be placed in buckets |
| Timeoffset | Seconds to add to the import data for this column |

Figure 3:
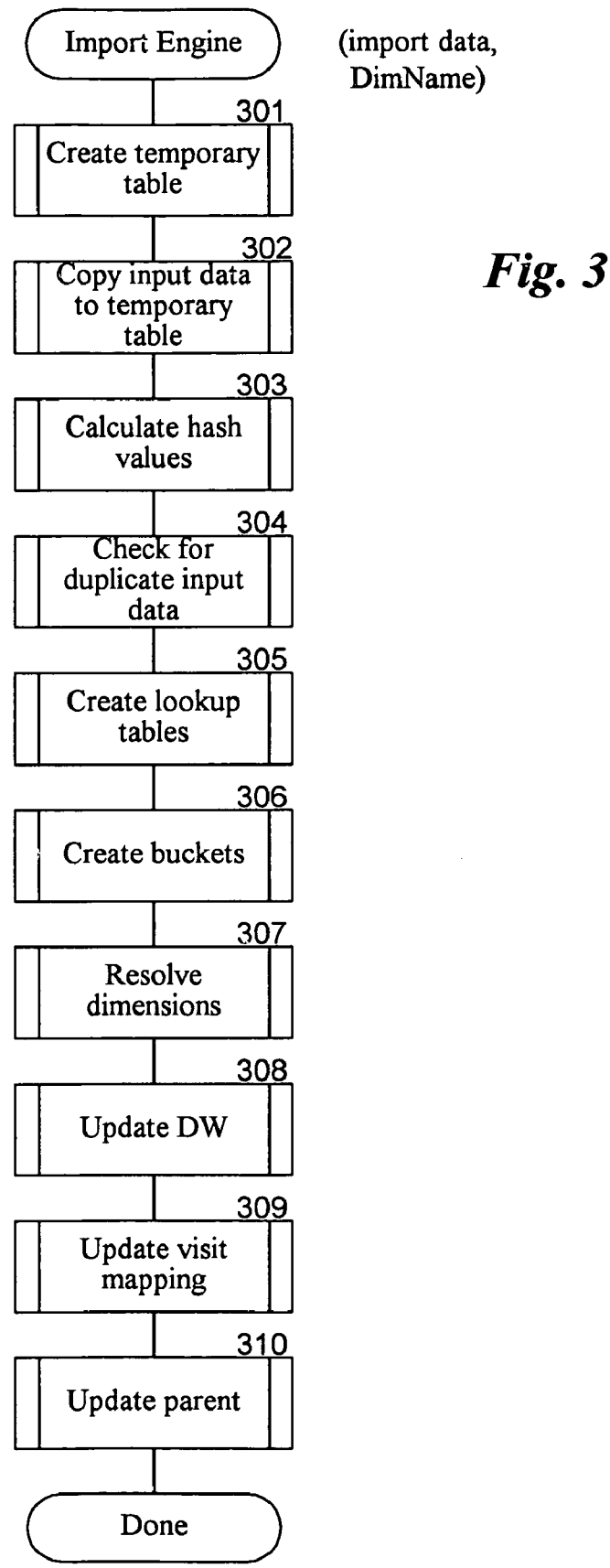
FIG. 3 is a flow diagram of the processing of the import engine in one embodiment.

FIGS. 3–13 are flow diagrams illustrating the processing of the import system in one embodiment. FIG. 3 is a flow diagram of the processing of the import engine in one embodiment. The import engine is passed the import data and the name of the table of the data warehouse into which the data is to be imported. The import engine may be invoked for each set of import data that is to be imported. The processing in each of the blocks of this flow diagram is further described in another flow diagram. In block 301, the engine creates a temporary table to store the import data before it is transferred to the data warehouse. In one embodiment, the engine may store the data directly in the table of the data warehouse based on the setting of the UseWorktables attribute of the meta_Dimension table. In block 302, the engine copies the import data to the temporary table. In block 303, the engine calculates the hash value for each of the rows of the temporary table. The hash values are used to help identify whether one row contains the same data as another row. For example, if a row to be imported contains the same data as a row currently in the table of the data warehouse. In block 304, the engine checks for duplicate data in the import data and removes the duplicate data. In block 305, the engine creates lookup tables for the columns of the table of the data warehouse. In block 306, the engine creates buckets for the columns whose IsContinuous attribute is set. In block 307, the engine resolves the dimensions in the temporary table. For example, if one of the columns of the table of the data warehouse holds a reference to a product table, then the rows of the temporary table are set to include a reference to the product table. In block 308, the engine updates the data warehouse based on the information in the temporary table. In block 309, the engine updates the visit mappings. That is, if the IsAddVisitInformation attribute of the meta_Dimension table is set, then the engine calculates and adds the corresponding visit identifier for each row added to the table of the data warehouse. In block 310, if the UpdateParent attribute of the meta_Dimension table is set, then the engine updates the parent table of this table in the data warehouse. The engine then completes its processing.

Figure 4:
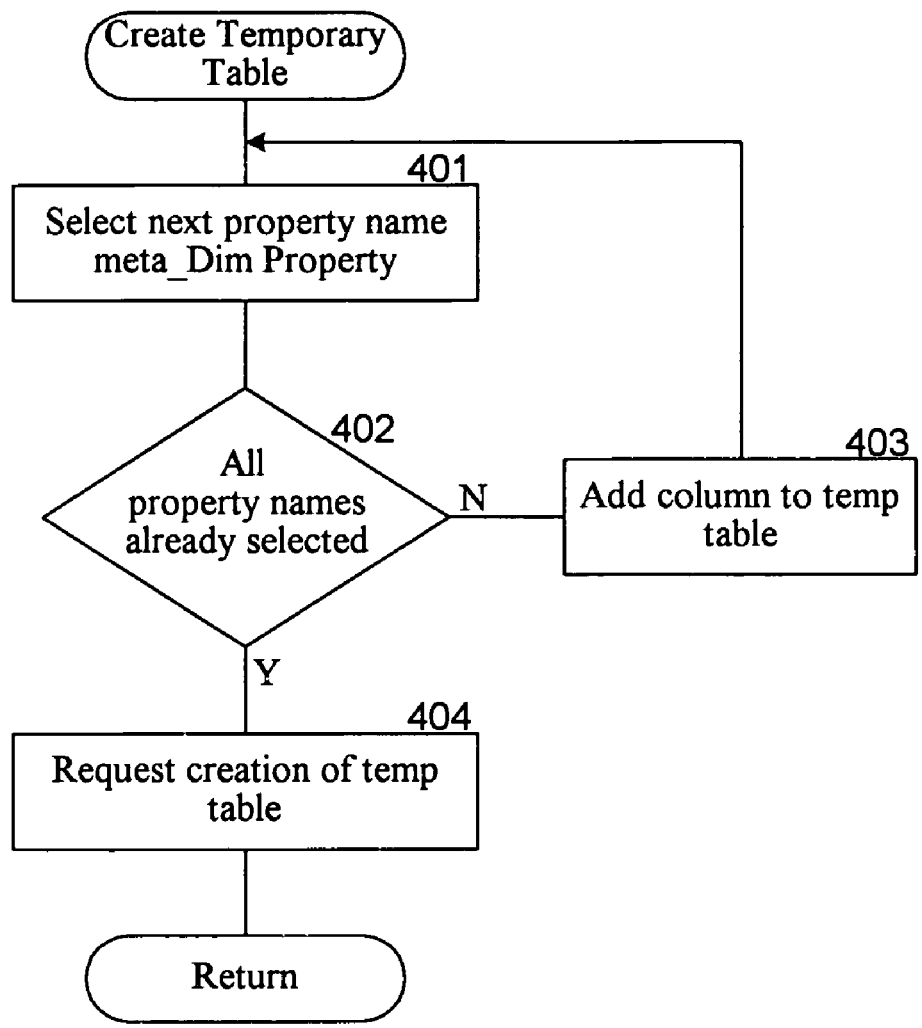
FIG. 4 is a flow diagram of the processing of the create temporary table function in one embodiment.

FIG. 4 is a flow diagram of the processing of the create temporary table function in one embodiment. This function is passed the name of the table and creates a temporary table with a column for each property of that table. In blocks 401–403, the function loops selecting each of the properties of the table and recording the column name for the temporary table. In block 401, the function selects the next property name of the meta_DimProperty table. In decision block 402, if all the property names have already been selected for the passed table, then the function continues at block 404, else the function continues at block 403. In block 403, the function adds a column for the selected property name to the temporary table and then loops to block 401 to select the next property name. In block 404, the function requests the creation of the temporary table with all of the columns identified in block 403. The function then returns. This function may also add other columns corresponding to the columns of the import data. For example, if the IsContinuous attribute is set for a property, then the function may add an additional column to the temporary table for the corresponding import value.

Figure 5:
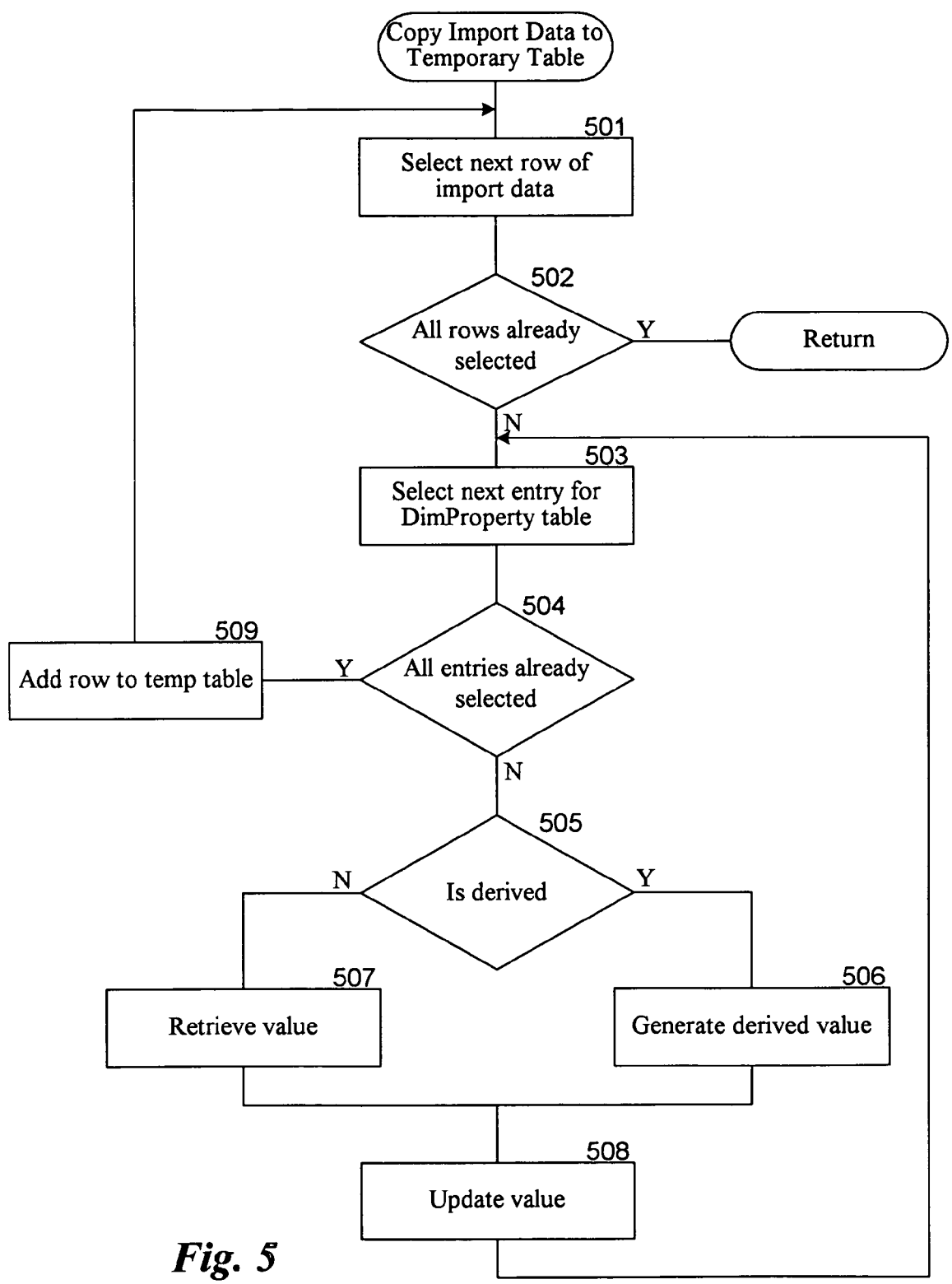
FIG. 5 is a flow diagram of the processing of the copy import data to temporary data function in one embodiment.

FIG. 5 is a flow diagram of the processing of the copy import data to temporary data function in one embodiment. This function copies each row of the import data to the temporary table and generates the derived values as appropriate. In blocks 501–509, the function loops, selecting and processing each row of the import data. In block 501, the function selects the next row of the import data. In decision block 502, if all the rows of the import data have already been selected, then the function returns, else the function continues at block 503. In blocks 503–508, the function loops, selecting each property of the table of the data warehouse and generating a value to store in the temporary table. In block 503, the function selects the next entry for the meta_DimProperty table. In decision block 504, if all the entries of the meta_DimProperty table have already been selected, then the function continues at block 509, else the function continues at block 505. In decision block 505, if the IsDerived flag is set for the selected entry, then the function continues at block 506, else the function continues at block 507. In block 506, the function generates the derived value using the TransformString attribute of the selected entry. In block 507, the function retrieves the value indicated by the ColumnNumber attribute from the selected row of import data. In block 508, the function adds the value to a row to be added to the temporary table and then loops to block 503 to select the next entry for the meta_DimProperty table. In block 509, the function adds the row to the temporary table that contains the values added in block 508. The function then loops to block 501 to select the next row of the import data. One skilled in the art will appreciate that the temporary table may contain a separate column for the value of the import data when the IsDerived attribute is set.

Figure 6:
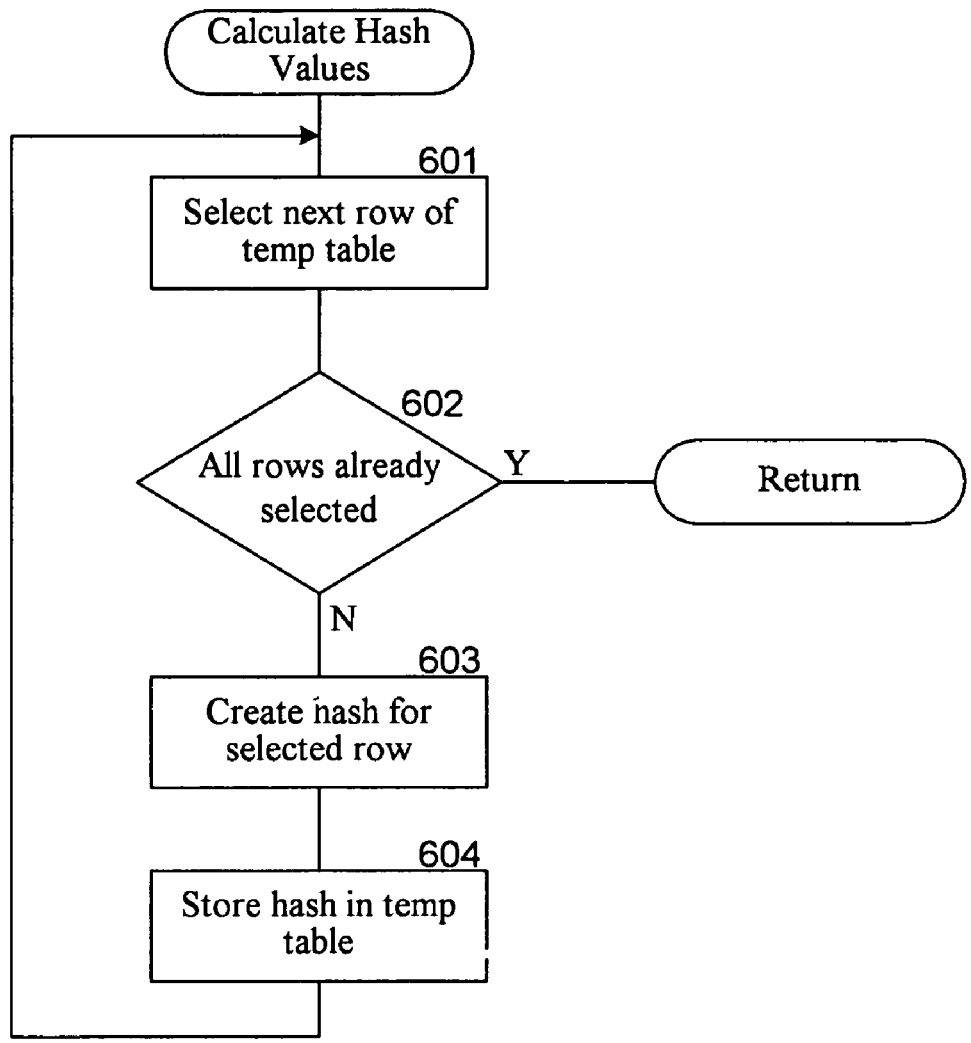
FIG. 6 is a flow diagram of the processing of the calculate hash values function in one embodiment.

FIG. 6 is a flow diagram of the processing of the calculate hash values function in one embodiment. The hash values are generated from the columns of the temporary table whose IsHash attribute is set. In block 601, the function selects the next row of the temporary table. In decision block 602, if all the rows of the temporary table have already been selected, then the function returns, else the function continues at block 603. In block 603, the function creates the hash value for the selected row by combining value of the columns whose IsHash attribute is set in the corresponding entries of the meta_DimProperty table. In block 604, the function stores the created hash value in the selected row of the temporary table. The function then loops to block 601 to select the next row of the temporary table. One skilled in the art will appreciate that the import engine would add a hash column to any table of the data warehouse with at least one property whose IsHash attribute is set.

Figure 7:
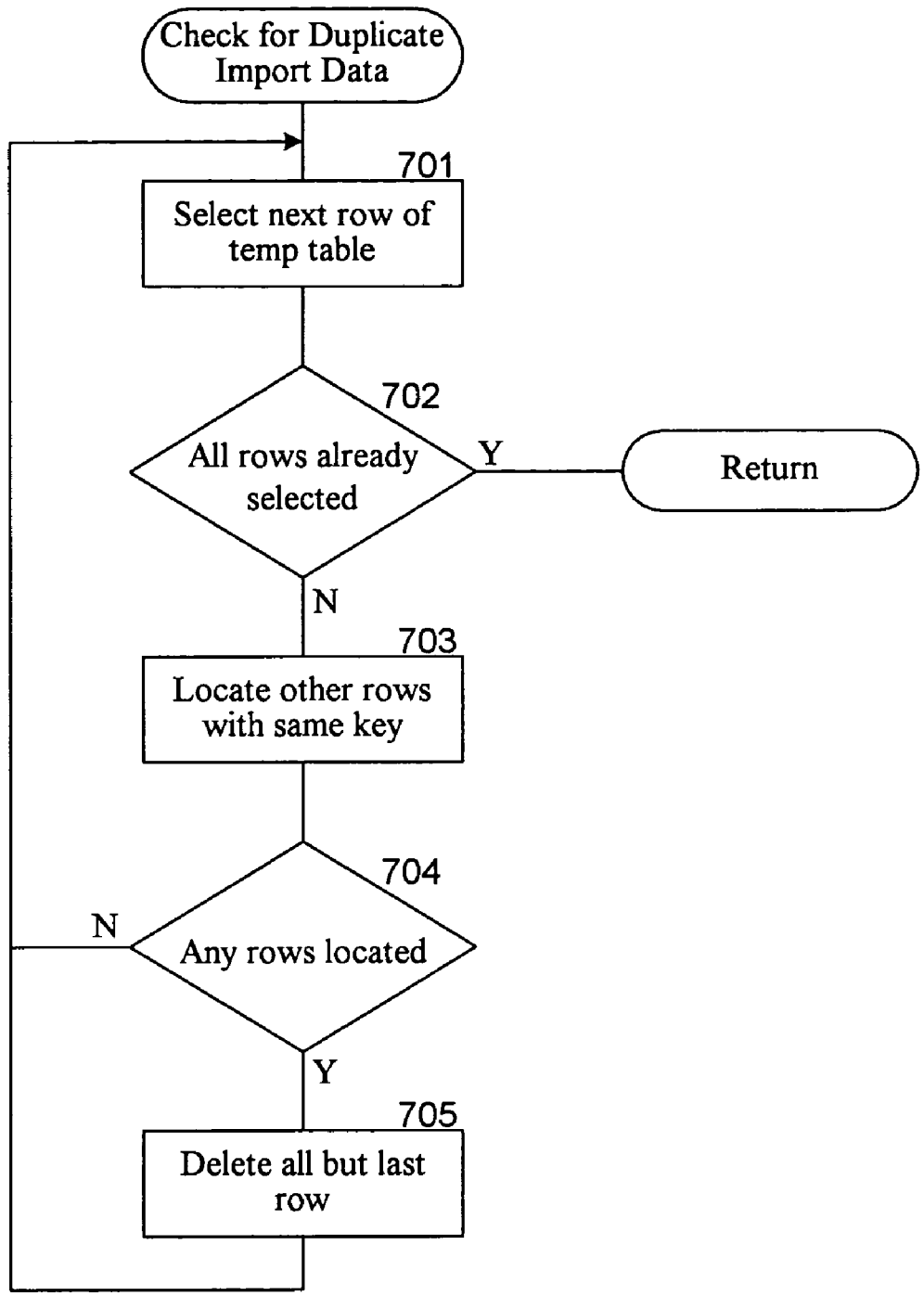
FIG. 7 is a flow diagram of the processing of the check for duplicate import data function.

FIG. 7 is a flow diagram of the processing of the check for duplicate import data function. This function checks for rows of the import data that contain the same information and deletes all but the last row. The rows are considered duplicates if the values in their columns with the IsIdentifiable attribute set are the same. That is, the combination of the values from the properties whose IsIdentifiable attribute is set is the key for the row, which may be unique. In block 701, the function selects the next row of the temporary table. In decision block 702, if all the rows of the temporary table have already been selected, then the function returns, else the function continues at block 703. In block 703, the function locates the duplicate rows. In decision block 704, if duplicate rows are located, then the function continues at block 705, else the function loops to block 701 to select the next row of the temporary table. In block 705, the function deletes all but the last duplicate row from the temporary table and then loops to block 701 to select the next row of the temporary table.

Figure 8:
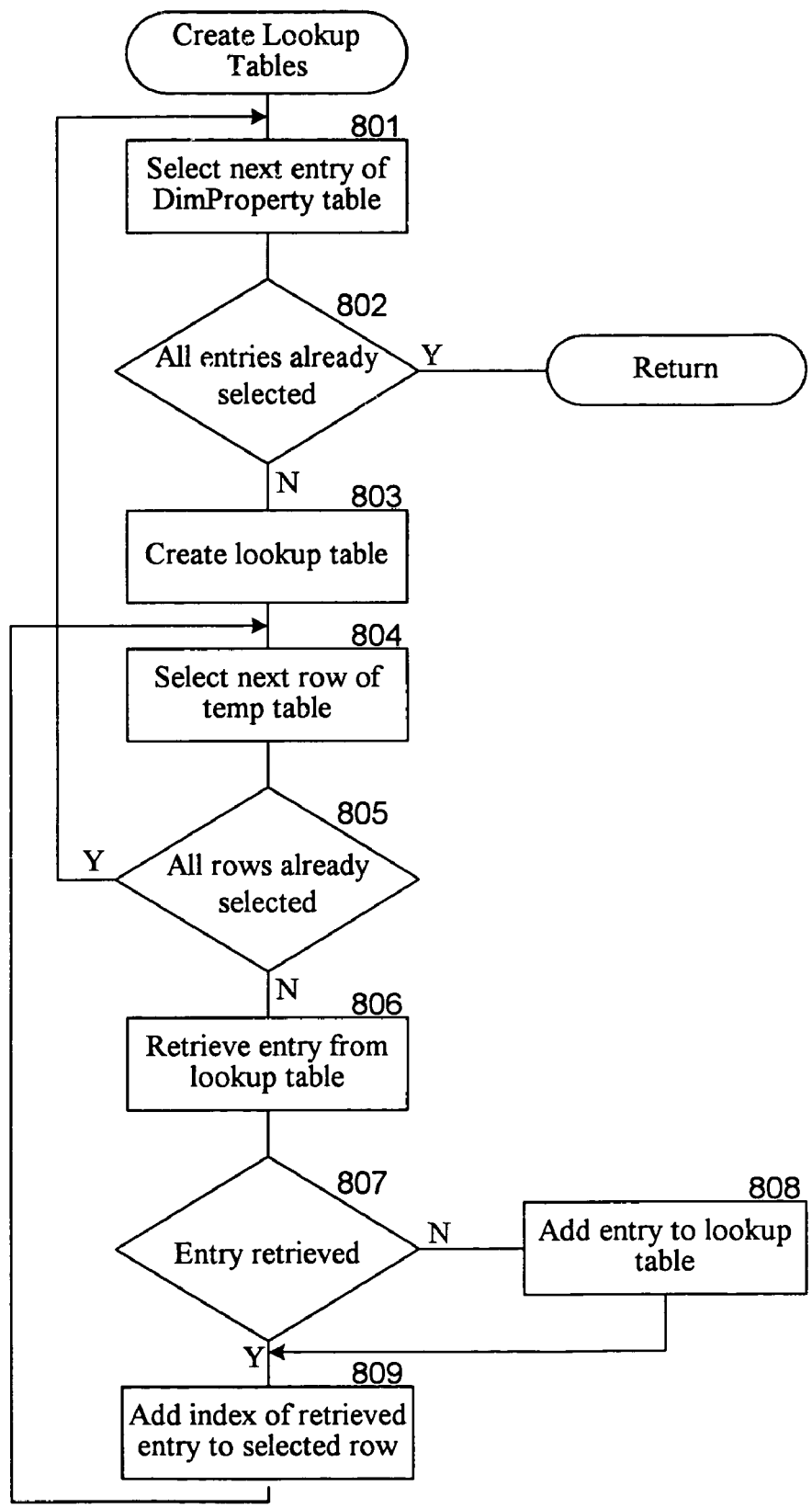
FIG. 8 is a flow diagram of the processing of the create lookup tables function.

FIG. 8 is a flow diagram of the processing of the create lookup tables function. This function loops, selecting each entry of the meta_DimProperty table that has its IsLookup attribute set and creating a lookup table for each such entry. The lookup tables may have names derived from the property name (e.g., "lookup_propertyname"). Lookup tables are used to represent import data that may be more compactly represented in an index to a table that contains the import data. For example, a property that contains the URL of accessed web pages (e.g., "www.acme.com/homepage") would be a candidate property for a lookup table. If the web site provides 16 different web pages, then the index into the lookup table can be represented by four bits, rather than, for example, 32 bytes of the URL. In block 801, the function selects the next entry of the meta_DimProperty table. In decision block 802, if all the entries of the meta_DimProperty table have already been selected, then the function returns, else the function continues at block 803. In block 803, the function creates a lookup table for the selected entry. In blocks 804–809, the function loops, selecting each row of the temporary table and adding the appropriate entries to the lookup table. In block 804, the function selects the next row of the temporary table. In decision block 805, if all the rows of the temporary table have already been selected, then the function loops to block 801 to select the next entry of the meta_DimProperty table, else the function continues at block 806. In block 806, the function retrieves the entry from the lookup table for the selected row of the temporary table. In decision block 807, if an entry was retrieved, then the function continues at block 809, else the function continues at block 808. In block 808, the function adds an entry to the lookup table corresponding to the value of the selected property for the selected row. In block 809, the function adds the index of the retrieved or added entry to the selected row and then loops to block 804 to select the next row of the temporary table. One skilled in the art will appreciate that the temporary table may include a column for holding the import value associated with each property whose IsLookup attribute is set.

Figure 9:
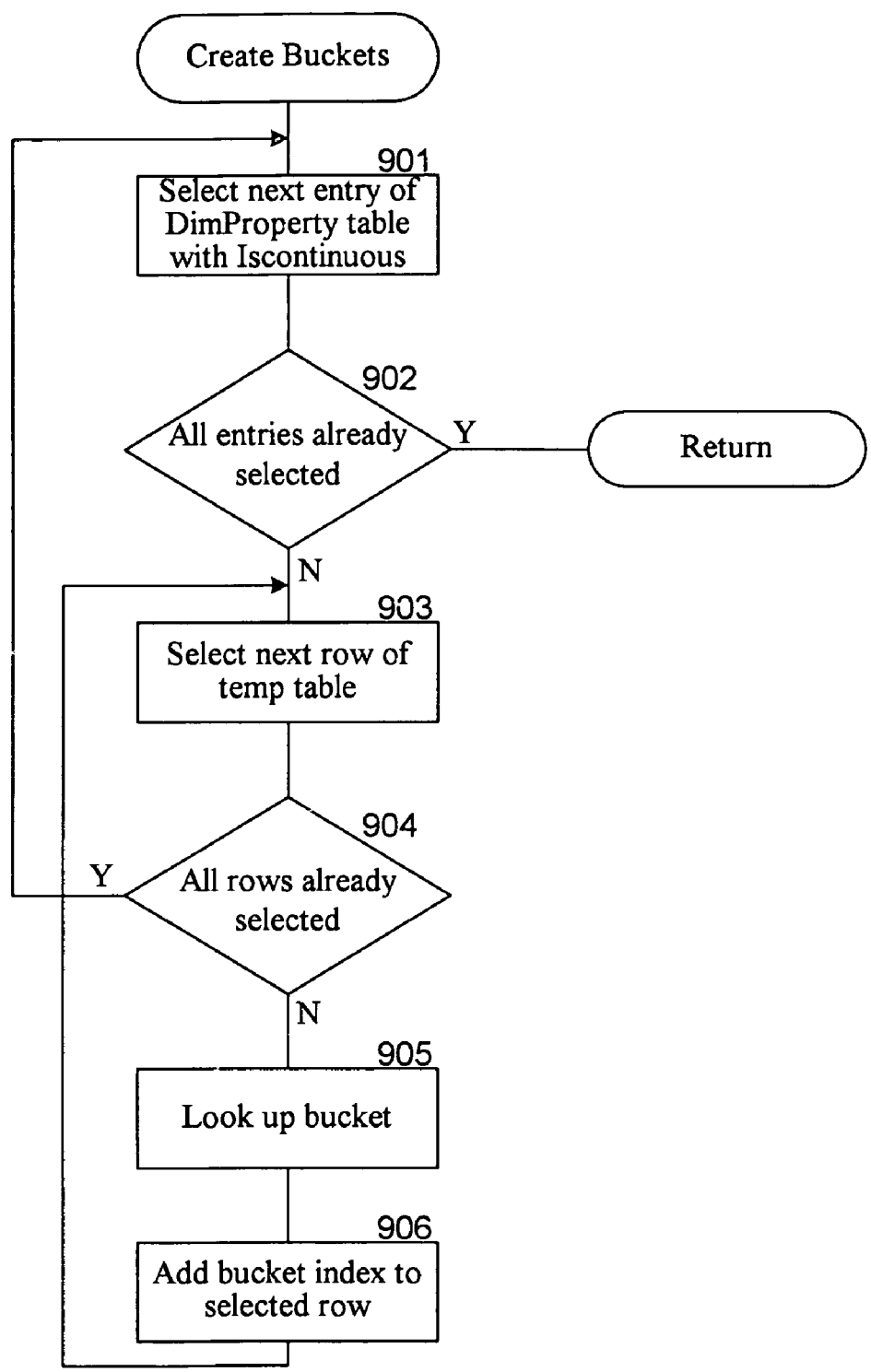
FIG. 9 is a flow diagram of the processing of the create buckets function in one embodiment.

FIG. 9 is a flow diagram of the processing of the create buckets function in one embodiment. This function creates bucket values for each column of the target table whose IsContinuous attribute is set. The bucket tables may be predefined tables with a name that is derived from the name of the selected property (e.g., "bucket_propertyname"). Each entry of a bucket table may specify the range associated with that bucket. For example, if the property corresponds to the salary of employees, then the first bucket may have a range that is less than $25,000, the second bucket may have a range from $25,000 to $50,000 and so on. The function would assign an index of 2 when the salary is $35,000. In blocks 901–906, the function loops, selecting each entry of the meta_DimProperty table whose IsContinuous attribute is set and identifying its bucket index. In block 901, the function selects the next entry of the meta_DimProperty table whose IsContinuous attribute is set. In decision block 902, if all such entries of the meta_DimProperty table have already been selected, then the function returns, else the function continues at block 903. In blocks 903–906, the function loops, selecting each row of the temporary table and updating its bucket index for the selected entry of the meta_DimProperty table. In block 903, the function selects the next row of the temporary table. In decision block 904, if all the rows of the temporary table have already been selected, then the function loops to block 901 to select the next entry of the meta_DimProperty table, else the function continues at block 905. In block 905, the function looks up the bucket index for the value of the selected row. In block 906, the function adds the bucket index to the selected row and loops to block 903 to select the next row of the temporary table. One skilled in the art would appreciate that the temporary table may contain an additional column for holding the import data corresponding to each property whose IsContinuous attribute is set.

Figure 10:
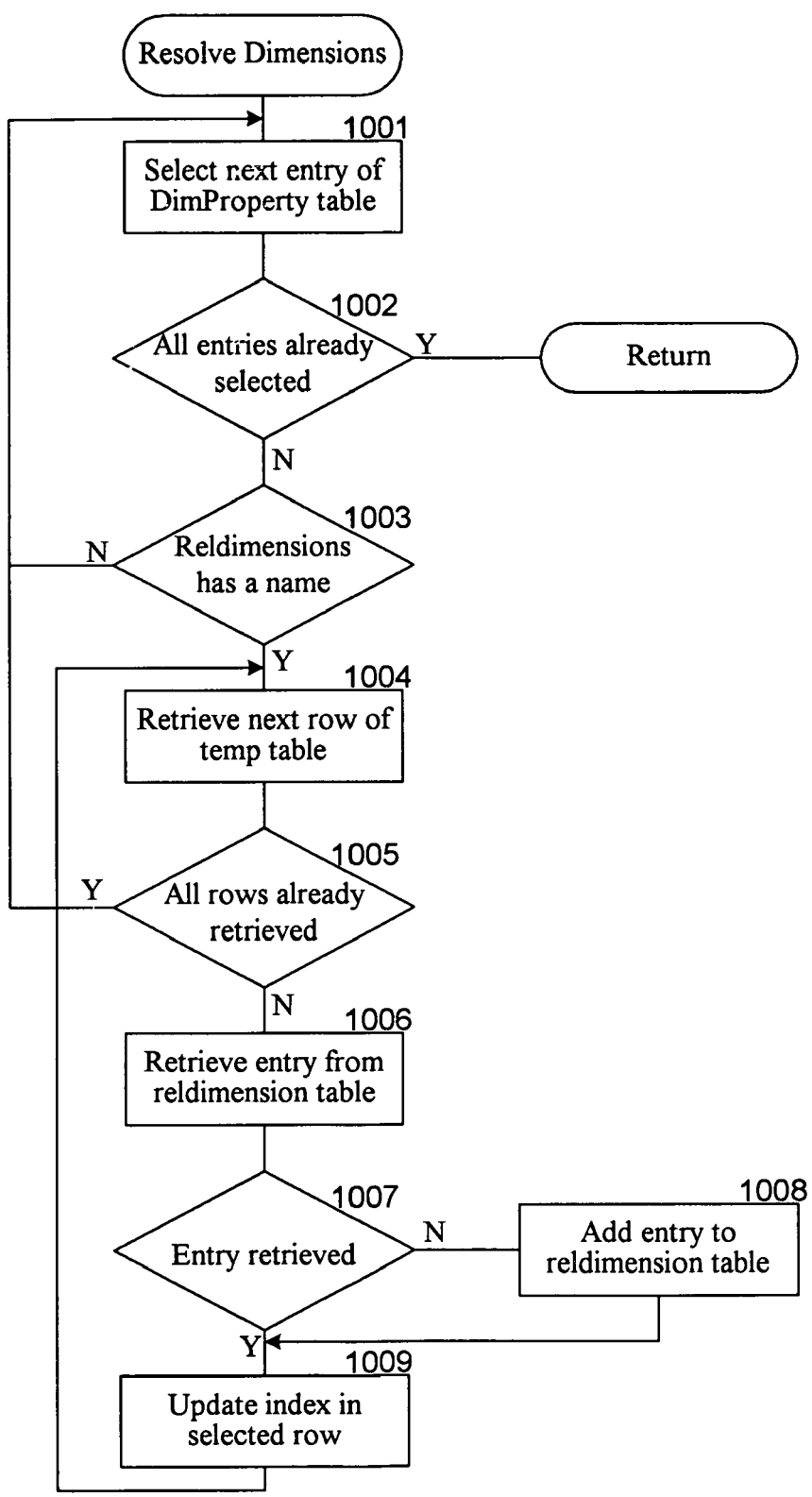
FIG. 10 is a flow diagram of the processing of the resolve dimensions function in one embodiment.

FIG. 10 is a flow diagram of the processing of the resolve dimensions function in one embodiment. The resolve dimensions function updates the columns of the table of the data warehouse that correspond to a property whose RelDimension attribute indicates a dimension table. The function loops, selecting each entry of the meta_DimProperty table. In block 1001, the function selects the next entry of the meta_DimProperty table. In decision block 1002, if all the entries have already been selected, then the function returns, else the function continues at block 1003. In decision block 1003, if the RelDimension attribute of the selected entry names a dimension table, then the function continues at block 1004, else the function loops to block 1001 to select the next entry of the meta_DimProperty table. In blocks 1004–1009, the function loops retrieving each row of the temporary table and resolving the values for the selected property. In block 1004, the function retrieves the next row of the temporary table. In decision block 1005, if all the rows of the temporary table have already been retrieved, then the function loops to block 1001 to select the next entry of the meta_DimProperty table, else the function continues at block 1006. In block 1006, the function retrieves the entry from the related dimension table as indicated by the ReIdimension attribute. In decision block 1007, if an entry was retrieved, then the function continues at block 1009, else the function continues at block 1008. In block 1008, the function adds an entry to the related dimension table. In block 1009, the function updates the column corresponding to the selected property in the selected row and then loops to block 1004 to select the next row of the temporary table.

Figure 11:
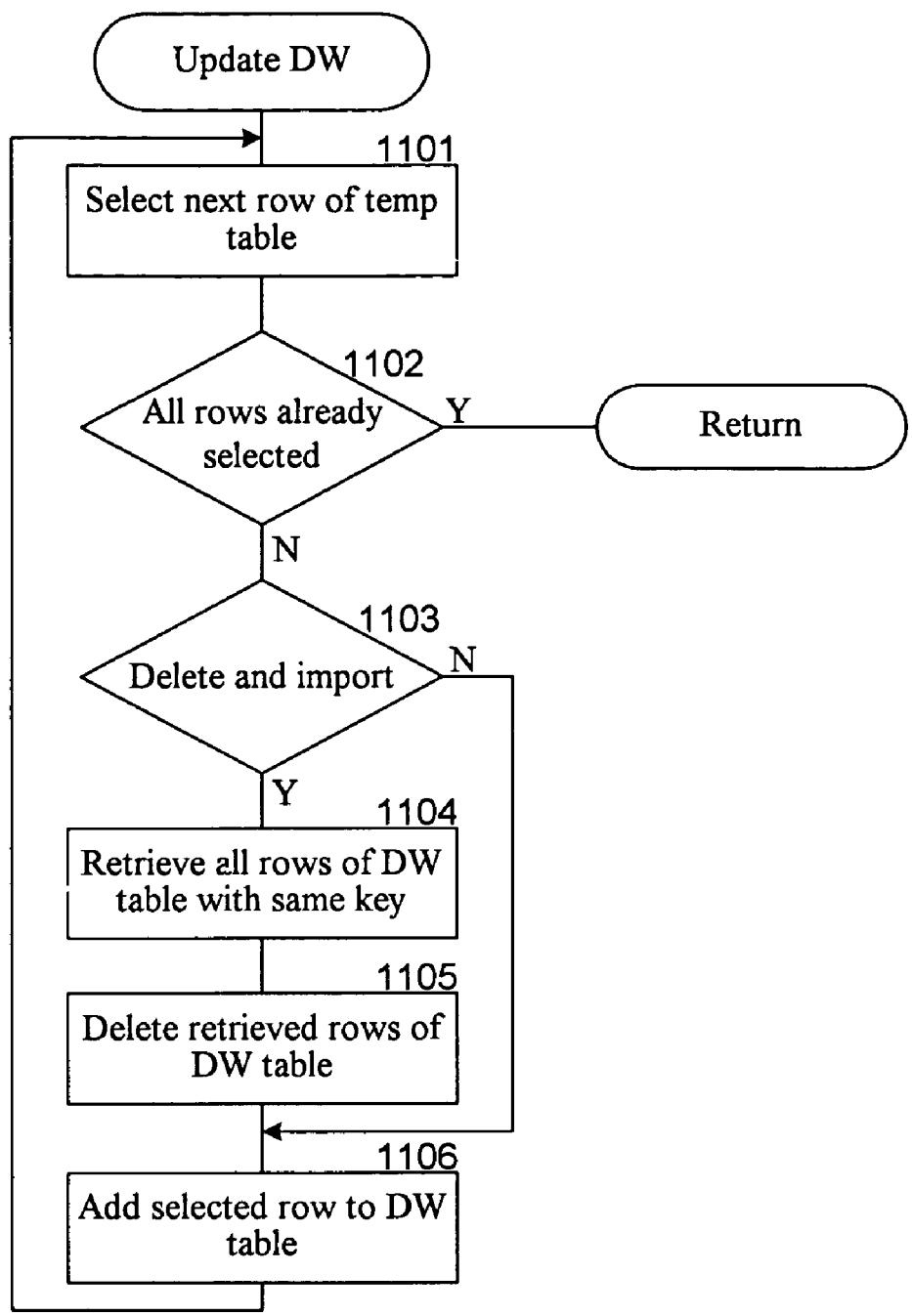
FIG. 11 is a flow diagram of the update data warehouse function in one embodiment.

FIG. 11 is a flow diagram of the update data warehouse function in one embodiment. This function copies the data of the temporary table to the table of the data warehouse. In block 1101, the function selects the next row of the temporary table. In decision block 1102, if all the rows of the temporary table have already been selected, then the function returns, else the function continues at block 1103. In decision block 1103, if the DeleteAndImport attribute of the meta_Dimension table entry is set, then the function continues at block 1104, else the function continues at block 1106. In block 1104, the function retrieves all rows of the data warehouse table with the same key (generated from properties whose IsIdentifiable attribute is set) as the selected row of the temporary table. In block 1105, the function deletes all the retrieved rows of the data warehouse table. In block 1106, the function adds the selected row of the temporary table to the data warehouse table. The function then loops to block 1101 to select the next row of the temporary table.

Figure 12:
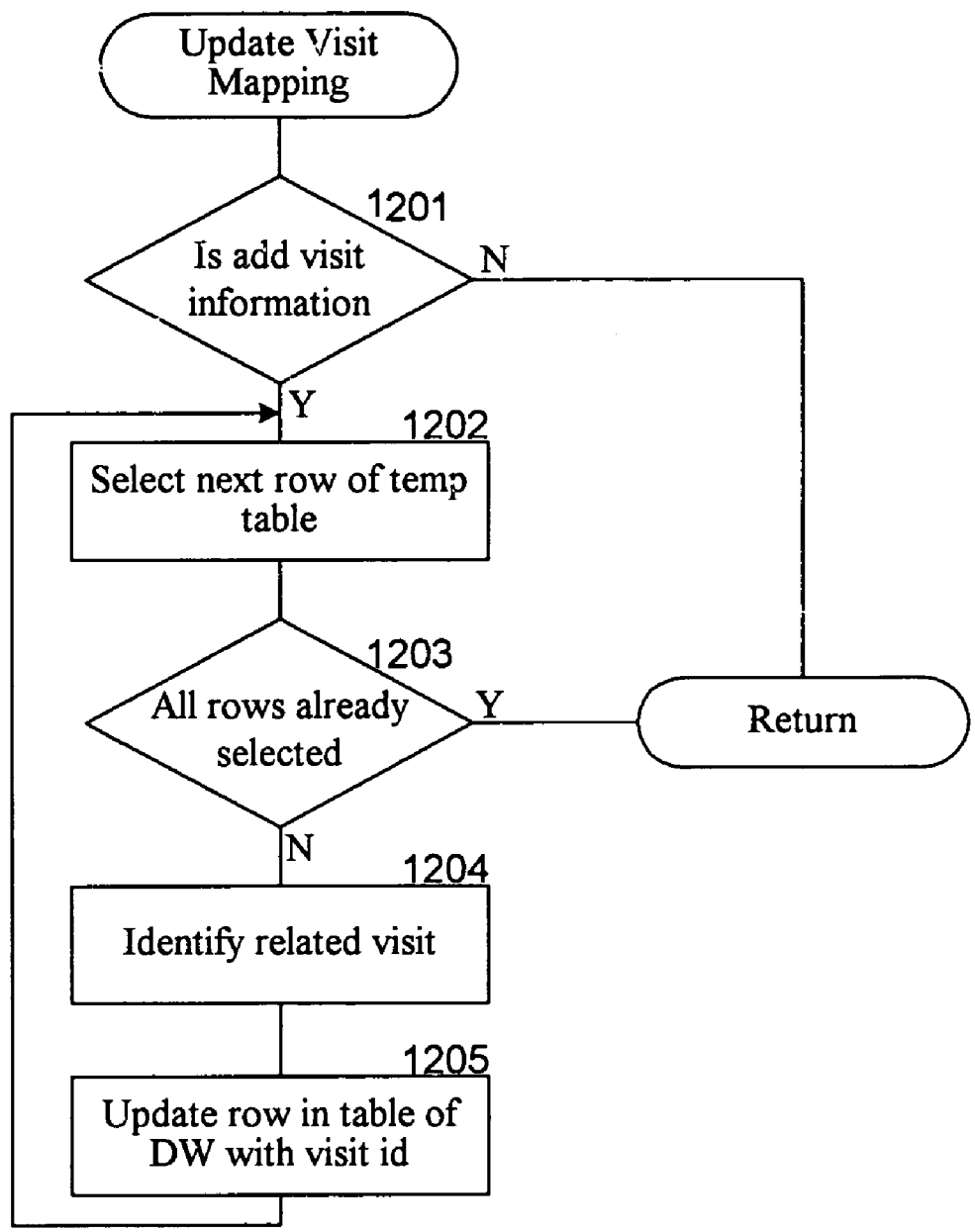
FIG. 12 is a flow diagram of the processing of the update visit mapping function in one embodiment.

FIG. 12 is a flow diagram of the processing of the update visit mapping function in one embodiment. This function updates the visit reference of the table in the data warehouse if the IsAddVisitInformation attribute of the meta_Dimension table is set. The import engine adds a visit reference column to each table whose IsAddVisitInformation attribute is set. In decision block 1201, if the IsAddVisitInformation attribute of the meta_Dimension table is set, then the function continues at block 1202, else the function returns. In blocks 1202–1205, the function loops selecting each row of the temporary table and updating its visit reference. In block 1202, the function selects the next row of the temporary table. In decision block 1203, if all the rows of the temporary table have already been selected, then the function returns, else the function continues at block 1204. In block 1204, the function identifies the related visit reference. The function may identify related visits based on timing information stored in the visit table of the data warehouse. In block 1205, the function updates the row of the data warehouse table corresponding to the selected row of the temporary table with the visit reference and then loops to block 1202 to select the next row of the temporary table.

Figure 13:
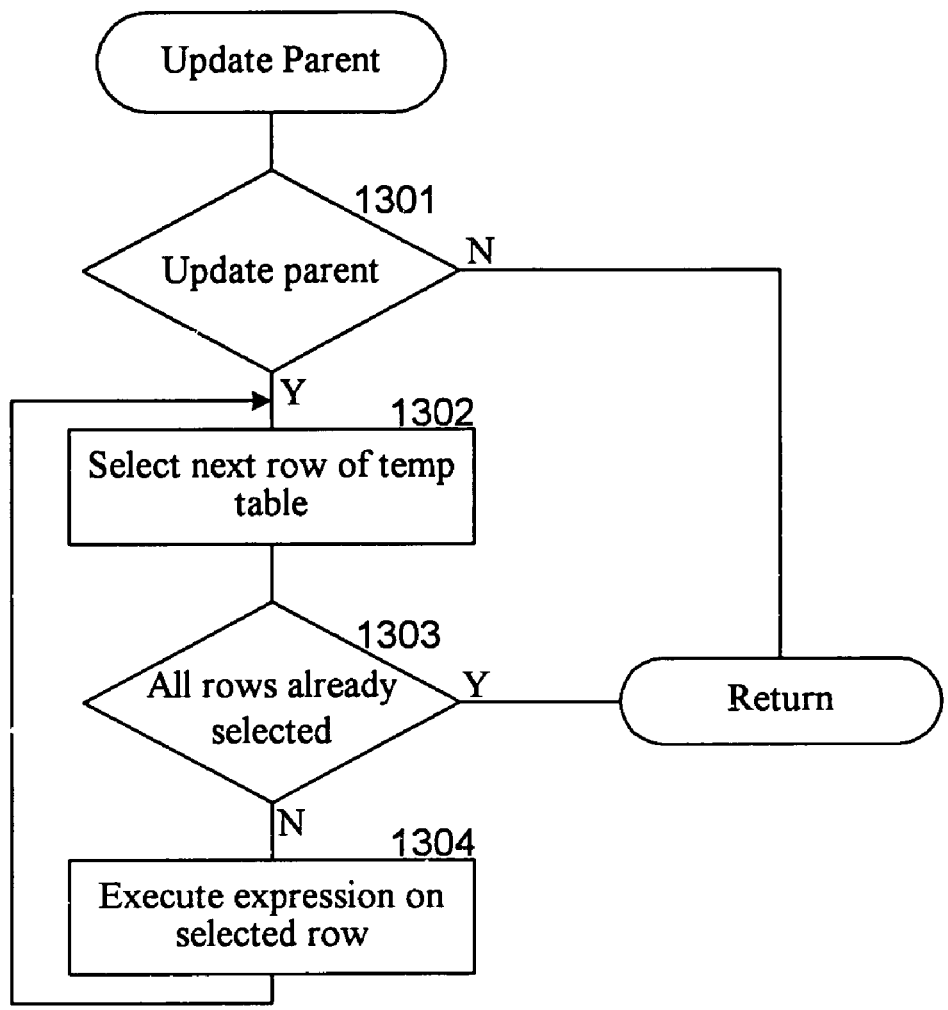
FIG. 13 is a flow diagram of the processing of the update parent function in one embodiment.

FIG. 13 is a flow diagram of the processing of the update parent function in one embodiment. This function updates the parent table in the data warehouse if the UpdateParent attribute contains the name of the parent table. The function updates the parent table by executing the code of the Expression attribute on each row of the temporary table. For example, the rows of the temporary table may correspond to line items of a purchase order and the parent table may contain a row for each purchase order. The expression may add the price for each line item to a total price column of the row for the purchase order in the parent table. In decision block 1301, if the UpdateParent attribute in the meta_Dimension table contains the name of parent table, then the function continues at block 1302, else the function returns. In block 1302, the function selects the next row of the temporary table. In decision block 1303, if all the rows of the temporary table have already been selected, then the function returns, else the function continues at block 1304. In block 1304, the function executes the expression on the selected row, which updates the corresponding parent entry in the data warehouse. The expression is specified by the Expression attribute. The function then loops to block 1302 to select the next row of the temporary table.

Figure 14:
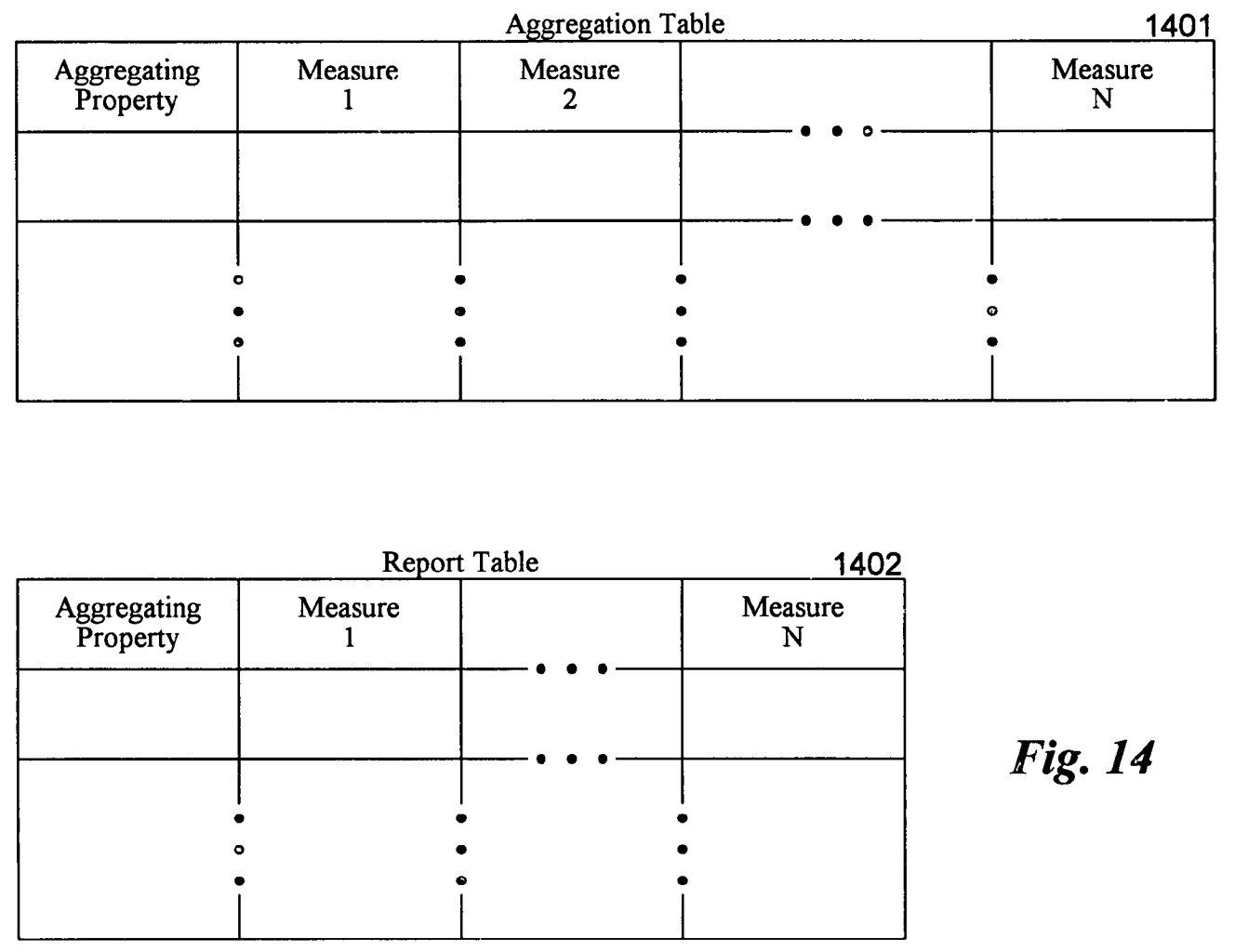

FIG. 14 is a block diagram illustrating the generation of an aggregation and report table. The aggregation table 1401 includes an aggregating property in the first column and the various measure columns. The aggregation engine inputs of the aggregation metadata that defines the aggregating property and the measure columns and creates the aggregation table. The report table 1402 similarly includes an aggregating property in the first column and various measure columns as defined by the aggregation metadata.

Figure 15:
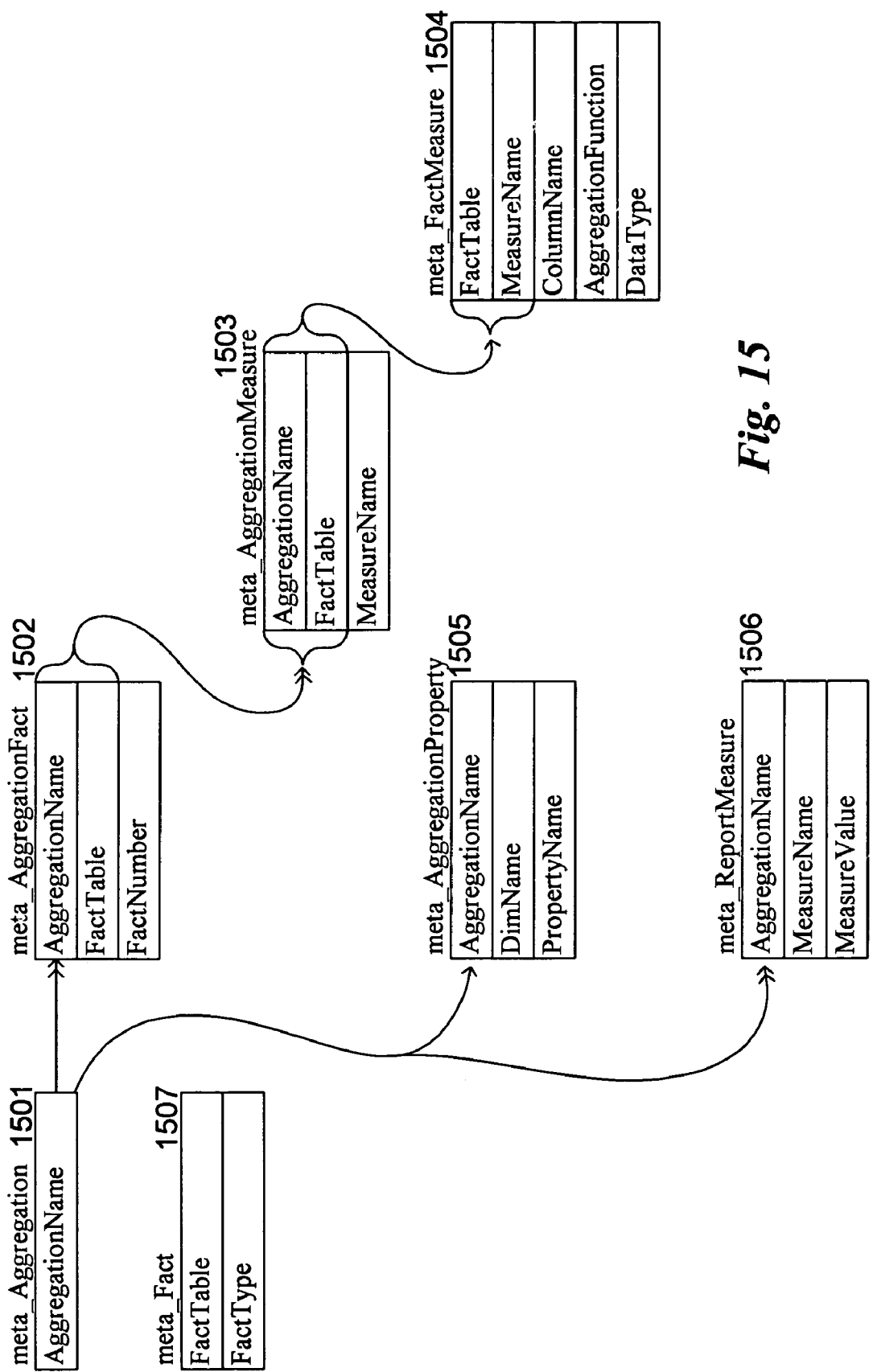
FIG. 15 is a block diagram illustrating the organization of the aggregation metadata in one embodiment.

FIG. 15 is a block diagram illustrating the organization of the aggregation metadata in one embodiment. The aggregation metadata includes a meta_Aggregation table 1501, a meta_AggregationFact table 1502, a meta_AggregationMeasure table 1503, a meta_FactMeasure table 1504, a meta_AggregationProperty table 1505, a meta_ReportMeasure table 1506, and a meta_Fact table 1507. The meta_Aggregation table contains an entry for each aggregation that is defined. The meta_AggregationFact table contains for each aggregation an entry for each fact table that is used to generate that aggregation. For example, a single aggregation may be generated from the data of five different fact tables in which case the meta_AggregationFact table would have five entries for that aggregation. The meta_AggregationMeasure table contains for each entry of the meta_AggregationFact table an entry for each measure of the aggregation that is generated from that fact table. The meta_FactMeasure table has for each fact table an entry for each measure that is generated from the fact table and specifies how that measure is to be generated. The meta_AggregationProperty table specifies the aggregating property for an aggregation. The meta_ReportMeasure table specifies the measure names to be included in the report for the aggregation. The meta_Fact table contains an entry for each fact table that is used in an aggregation. The following tables describe the contents of these tables.

| meta_Aggregation Table | |
|---|---|
| AttributeName | Description |
| AggregationName | Name of this aggregation |

| meta_AggregationFact Table | |
|---|---|
| AttributeName | Description |
| AggregationName | Name of this aggregation |
| FactTable | Name of fact table to used in this aggregation |
| FactNumber | Ordinal position of the fact |

| meta_AggregationMeasure Table | |
|---|---|
| AttributeName | Description |
| AggregationName | Name of aggregation |
| FactTable | Name of fact table for this aggregation |
| MeasureName | Name of measure for this aggregation for this fact table |

| meta_FactMeasure Table | |
|---|---|
| AttributeName | Description |
| FactTable | Name of the fact table to which the measure applies |
| MeasureName | Name of the measure |
| ColumnName | Name of the column for this measure |
| AggregationFunction | Code for calculating measure value (e.g., count or sum) |
| DataType | Type of measure (e.g., integer) |

| meta_AggregationProperty Table | |
|---|---|
| AttributeName | Description |
| AggregationName | Name of aggregation |
| DimName | Name of dimension table |
| PropertyName | Name of property within dimension table |

| meta_ReportMeasure Table | |
|---|---|
| AttributeName | Description |
| AggregationName | Name of aggregation |
| MeasureName | Name of this measure for report derived from this aggregation |
| MeasureValue | Code for calculating value for this measure in report |

| meta_Fact Table | |
|---|---|
| AttributeName | Description |
| FactTable | Name of this fact table |
| FactType | Type of this fact table (e.g., visit and transaction) |

Figure 16:
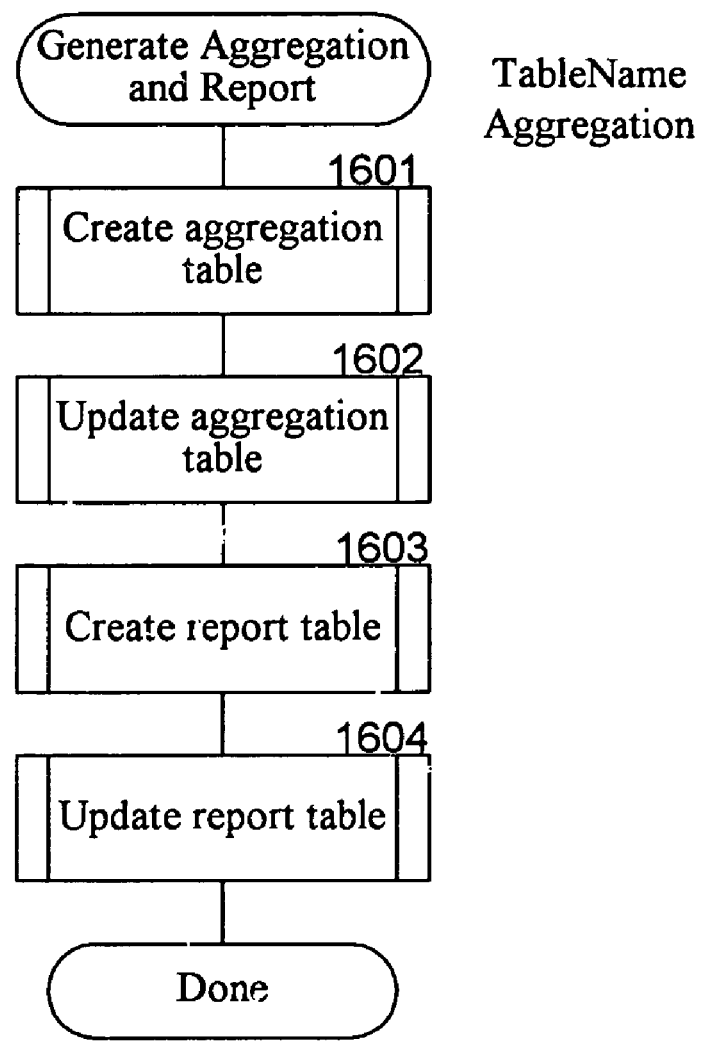
FIG. 16 is a flow diagram of the processing of the aggregation engine in one embodiment.

FIG. 16 is a flow diagram of the processing of the aggregation engine in one embodiment. The engine is passed the name of an aggregation and generates the aggregation and report tables as specified by the aggregation metadata. The processing of each of the blocks of this flow diagram is described in detail in a flow chart that follows. In block 1601, the engine creates the aggregation table with the appropriate columns as defined by the aggregation metadata. In block 1602, the function updates the aggregation table to include the aggregating property and measures as defined by the aggregation metadata. In block 1603, the function creates the report table with the appropriate columns as defined by the aggregation metadata. In block 1604, the function updates the report table as defined by the aggregation metadata and then completes.

Figure 17:
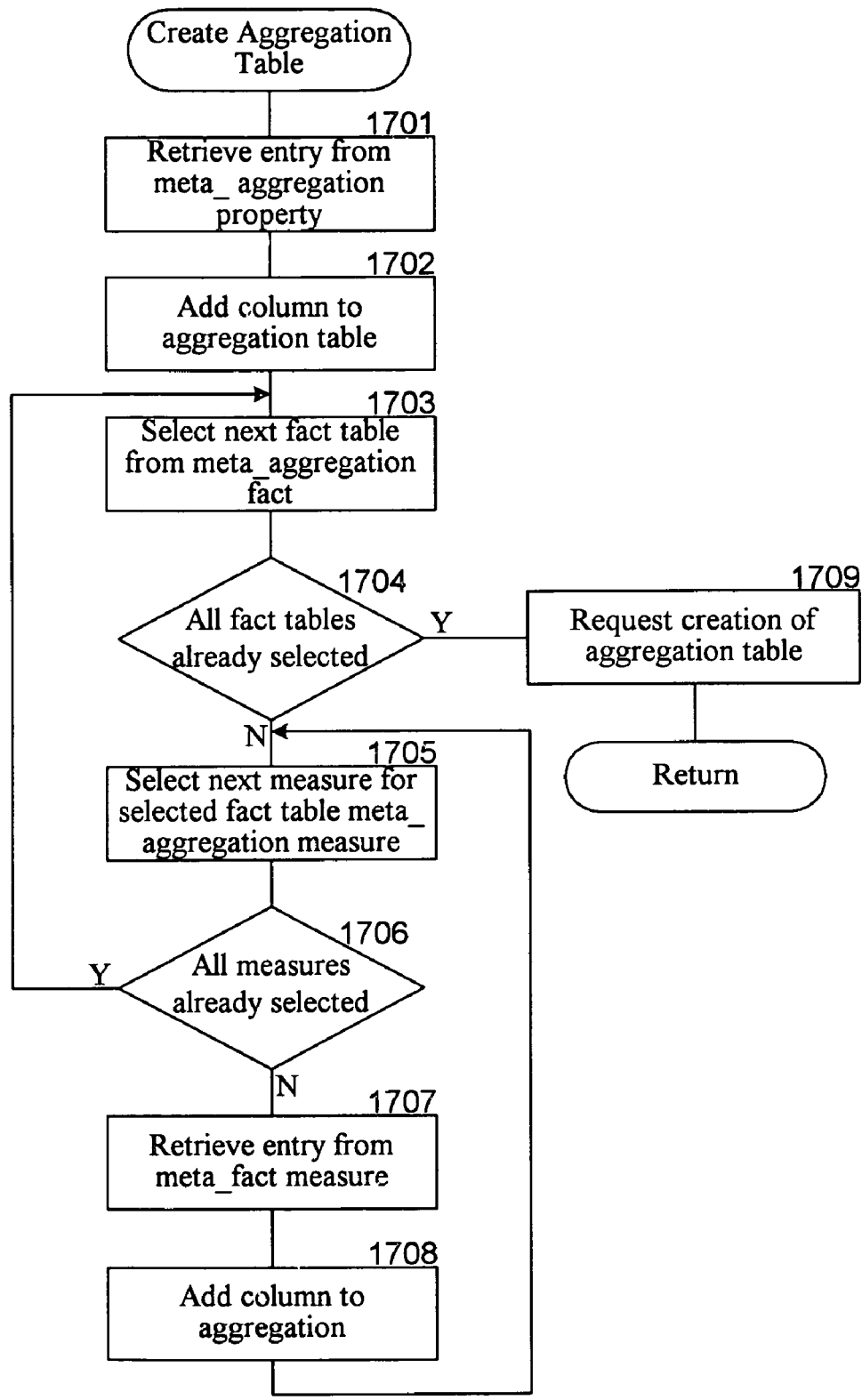
FIG. 17 is a flow diagram of the processing of the create aggregation table function in one embodiment.

FIG. 17 is a flow diagram of the processing of the create aggregation table function in one embodiment. This function is passed the name of an aggregation. This function identifies the aggregation property and each measure from the aggregation metadata that is to be included in the aggregation table for the aggregation. The function then requests the database system to create the table. In block 1701, the function retrieves the entry from the meta_AggregationProperty A table for the aggregation. In block 1702, the function adds a column for the aggregating property to the aggregation table corresponding to the selected entry. In blocks 1703–1708, the function loops, selecting each measure for each fact table included in the aggregation and adding a corresponding column to the aggregation table. In block 1703, the function selects the next fact table from the meta_AggregationFact table. In decision block 1704, if all the fact tables of the meta_AggregationFact table have already been selected, then the function continues at block 1709, else the function continues at block 1705. In block 1705, the function selects the next measure for the selected fact table from the meta_AggregationMeasure table. In decision block 1706, if all the measures have already been selected for the selected fact table, then the function loops to block 1703 to select the next fact table from the meta_AggregationFact table, else the function continues at block 1707. In block 1707, the function retrieves the entry from the meta_FactMeasure table for the selected fact table and the selected measure. In block 1708, the function adds a column to the aggregation table corresponding to the retrieved entry and then loops to block 1705 to select the next measure. In block 1709, the function requests creation of the aggregation table with the added columns.

Figure 18:
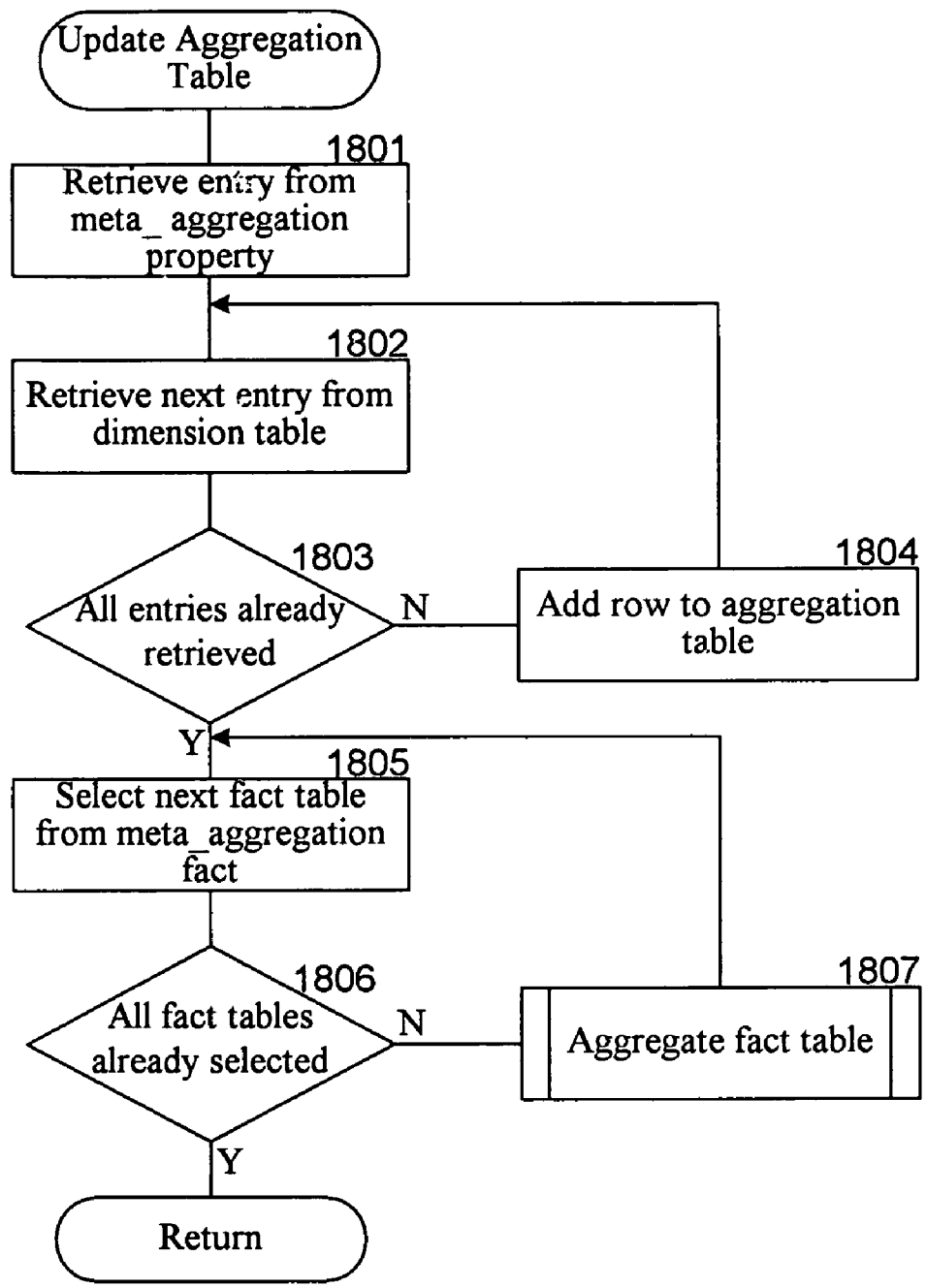
FIG. 18 is a flow diagram of the processing of the update aggregation table function in one embodiment.

FIG. 18 is a flow diagram of the processing of the update aggregation table function in one embodiment. This function is passed the name of the aggregation. The function adds a row to the aggregation table that corresponds to each entry of the dimension table corresponding to the aggregating property. In one embodiment, the function might only add to the aggregation table rows corresponding to rows of the dimension table that are pointed to by the fact tables used in the aggregation. The function then selects each fact table and generates for each row of the aggregation table the measures derived from that fact table. In block 1801, the function retrieves the entry from the meta_AggregationProperty table. In blocks 1802–1804, the function loops, adding a row to the aggregation table for each row of the dimension table identified by the retrieved entry of the meta_AggregationProperty table. In block 1802, the function retrieves the next entry from dimension table. In decision block 1803, if all the entries have already been retrieved, then the function continues at block 1805, else the function continues at block 1804. In block 1804, the function adds a row to the aggregation table and then loops to block 1802 to retrieve the next entry from the dimension table. In blocks 1805–1807, the function loops, selecting each fact table that is used in the aggregation and calculating the measures derived from the fact table. In block 1805, the function selects the next fact table from the meta_AggregationFact table. In decision block 1806, if all the fact tables have already been selected, then the function returns, else the function continues at block 1807. In block 1807, the function aggregates the data of the fact table by invoking the aggregate fact table function and then loops to block 1805 to select the next fact table.

Figure 19:
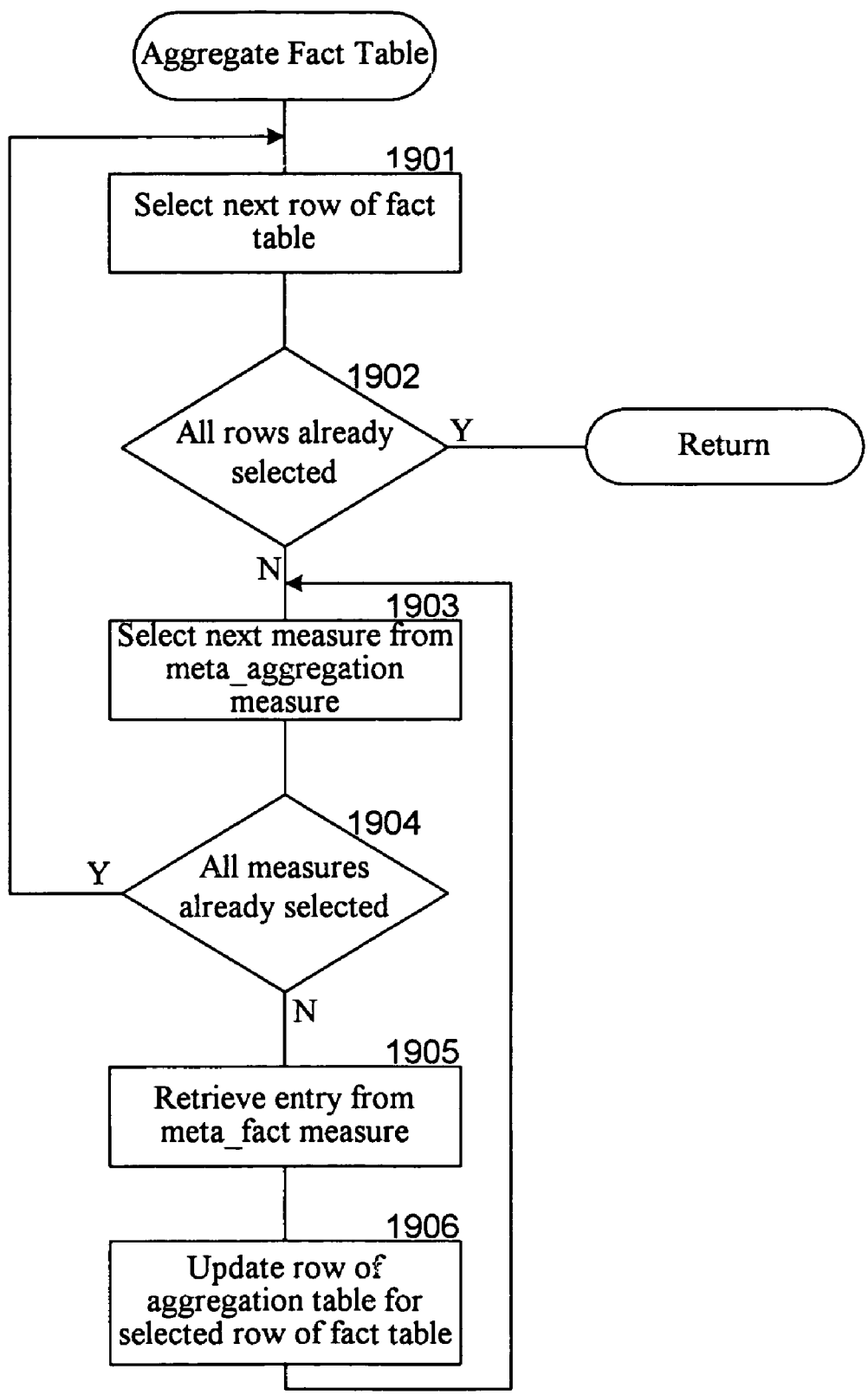
FIG. 19 is a flow diagram of the processing of the aggregate fact table function in one embodiment.

FIG. 19 is a flow diagram of the processing of the aggregate fact table function in one embodiment. This function is passed the name of an aggregation and the name of a fact table used in that aggregation. The function selects each row of the fact table and aggregates each measure derived from that fact table into the aggregation table. In block 1901, the function selects the next row of the fact table. In decision block 1902, if all the rows of the selected fact table have already been selected, then the function returns, else the function continues at block 1903. In blocks 1903–1906, the function loops, calculating the measure value for the selected row for each measure derived from the fact table. In block 1903, the function selects the next measure from the meta_AggregationMeasure table. In decision block 1904, if all the measures have already been selected, then the function loops to block 1901 to select the next row of the fact table, else the function continues at block 1905. In block 1905, the function retrieves the entry from the meta_FactMeasure table. In block 1906, the function updates the selected measure of a row of the aggregation table based on the selected row of the fact table. The updating is in accordance with the aggregation function of the retrieved entry from the meta_FactMeasure table. The function then loops to block 1903 to select the next measure.

Figure 20:
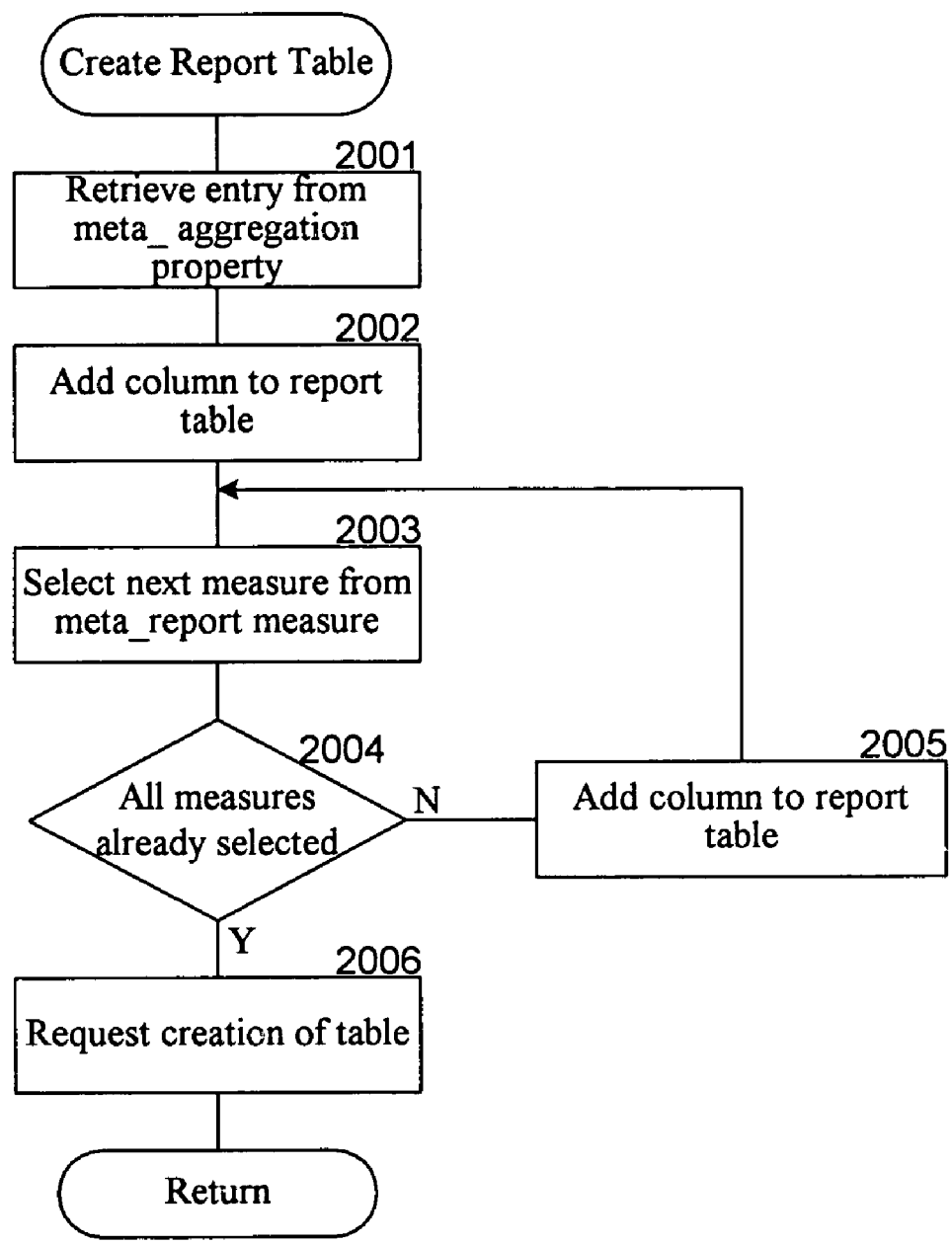
FIG. 20 is a flow diagram of the processing of the create report table.

FIG. 20 is a flow diagram of the processing of the create report table. This function is passed the name of an aggregation. The function creates a report table that includes a column for the aggregating property and a column for each measure in the report. In block 2001, the function retrieves the entry from the meta_AggregationProperty table for the aggregation. In block 2002, the function adds a column to the report table corresponding to the aggregating property. In blocks 2003–2005, the function loops, adding a column to the report table for each measure to be included in the report. In block 2003, the function selects the next measure from the meta_ReportMeasure table. In decision block 2004, if all the measures have already been selected, then the function continues at block 2006, else the function continues at block 2005. In block 2005, the function adds a column to the report table corresponding to the selected measure and then loops to block 2003 to select the next measure. In block 2006, the function requests the creation of the report table and then returns.

Figure 21:
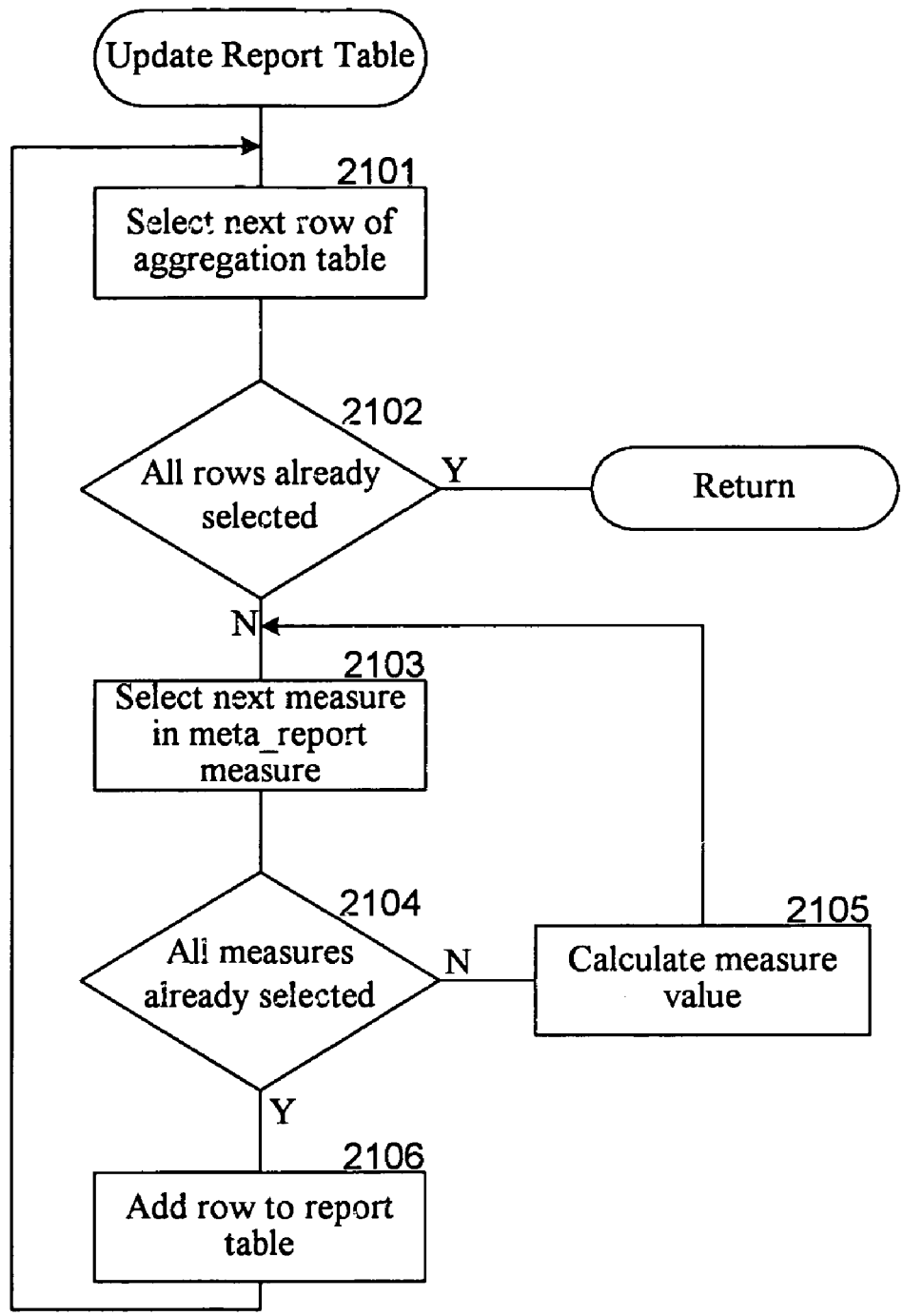
FIG. 21 is a flow diagram of the update report table function in one embodiment.

FIG. 21 is a flow diagram of the update report table function in one embodiment. This function is passed the name of an aggregation. The function adds a row to the report table corresponding to each row of the aggregation table with measure values calculated in accordance with the meta_ReportMeasure table. In block 2101, the function selects the next row of the aggregation table. In decision block 2102, if all the rows of the aggregation table have already been selected, then the function returns, else the function continues at block 2103. In block 2103, the function selects the next measure of the meta_ReportMeasure table. In block 2104, if all the measures have already been selected, then the function continues at block 2106, else the function continues at block 2105. In block 2105, the function calculates the value for this measure using the MeasureValue attribute of the measure and then loops to block 2103 to select the next measure. In block 2106, the function adds a row to the report table corresponding to the measure values calculated in block 2105 and then loops to block 2101 to select the next row is of the aggregation table.

From the above description, it will be appreciated that although specific embodiments of the technology have been described for purposes of illustration, various modifications may be made without deviating from the spirit and scope of the invention. For example, the import metadata may be used to transform the data of a data store. In such a situation, the data store may be considered to have data that is to be "imported" into other tables of the data store, which may be defined by the metadata itself. Alternatively, the tables defined by the metadata can be part of a separate data store. One skilled in the art will also appreciate that the metadata can be stored in various different ways and need not be stored in separate tables as described above. Accordingly, the invention is not limited except by the appended claims.

What is claimed is:

1. A method in a computer system for importing import data into a data store, the method comprising:
   providing metadata that defines a schema for the data store and defines how the import data is to be stored in the data store;
   receiving import data to be stored in the data store;
   after receiving the import data, generating the data store in accordance with the schema defined by the provided metadata; and
   storing data into the generated data store in accordance with how the import data is to be stored in the data store as indicated by the provided metadata
   wherein the metadata includes an indication of a name of each table of the data store,
   wherein the metadata includes for each table of the data store and indication of each property of the table, and
   wherein the metadata includes an attribute for each property indicating whether that property should be included in a hash value.

2. A method in a computer system for importing import data into a data store, the method comprising:
   providing metadata that defines a schema for the data store and defines how the import data is to be stored in the data store;
   receiving import data to be stored in the data store;
   after receiving the import data, generating the data store in accordance with the schema defined by the provided metadata; and
   storing data into the generated data store in accordance with how the import data is to be stored in the data store as indicated by the provided metadata
   wherein the metadata includes an indication of a name of each table of the data store,
   wherein the metadata includes for each table of the data store and indication of each property of the table, and
   wherein the metadata includes an attribute for each property indicating whether that property should be includes in a key.

3. A method in a computer system for importing import data into a data store, the method comprising:
   providing metadata that defines a schema for the data store and defines how the import data is to be stored in the data store;
   receiving import data to be stored in the data store;
   after receiving the import data, generating the data store in accordance with the schema defined by the provided metadata; and storing data into the generated data store in accordance with how the import data is to be stored in the data store as indicated by the provided metadata wherein the metadata includes an indication of a name of each table of the data store, wherein the metadata includes for each table of the data store and indication of each property of the table, and wherein the metadata include an attribute for each property indicating whether a value for that property should be derived from a related dimension table.

4. A method in a computer system for importing import data into a data store, the method comprising:

providing metadata that defines a schema for the data store and defines how the import data is to be stored in the data store;

receiving import data to be stored in the data store;

after receiving the import data, generating the data store in accordance with the schema defined by the provided metadata; and storing data into the generated data store in accordance with how the import data is to be stored in the data store as indicated by the provided metadata wherein the metadata includes an indication of a name of each table of the data store, wherein the metadata includes for each table of the data store and indication of each property of the table, and wherein the metadata includes an attribute for each property indicating whether the import data for that property should be grouped into buckets.

5. A computer system for importing import data into a data store, comprising:

metadata store containing metadata that defines a schema for the data store and defines how the import data is to be stored in the data store;

import data store containing import data to be stored in the data store;

a data store generating component that generates the data store in accordance with the schema defined by the metadata; and a storing component that stores data into the generated data store in accordance with how the import data is to be stored in the data store as indicated by the metadata wherein the metadata includes an indication of a name of each table of the data store, wherein the metadata includes for each table of the data store an indication of each property of the table, and wherein the metadata includes an attribute for each property indicating whether that property should be included in a hash value.

6. A computer system for importing import data into a data store, comprising:

metadata store containing metadata that defines a schema for the data store and defines how the import data is to be stored in the data store;

import data store containing import data to be stored in the data store;

a data store generating component that generates the data store in accordance with the schema defined by the metadata; and a storing component that stores data into the generated data store in accordance with how the import data is to be stored in the data store as indicated by the metadata wherein the metadata includes an indication of a name of each table of the data store, wherein the metadata includes for each table of the data store an indication of each property of the table, and wherein the metadata includes an attribute for each property indicating whether that property should be includes in a key.

7. A computer system for importing import data into a data store, comprising:

metadata store containing metadata that defines a schema for the data store and defines how the import data is to be stored in the data store;

import data store containing import data to be stored in the data store;

a data store generating component that generates the data store in accordance with the schema defined by the metadata; and a storing component that stores data into the generated data store in accordance with how the import data is to be stored in the data store as indicated by the metadata wherein the metadata includes an indication of a name of each table of the data store, wherein the metadata includes for each table of the data store an indication of each Property of the table, and wherein the metadata include an attribute for each property indicating whether a value for that property should be derived from a related dimension table.

8. A computer system for importing import data into a data store, comprising:

metadata store containing metadata that defines a schema for the data store and defines how the import data is to be stored in the data store;

import data store containing import data to be stored in the data store;

a data store generating component that generates the data store in accordance with the schema defined by the metadata; and a storing component that stores data into the generated data store in accordance with how the import data is to be stored in the data store as indicated by the metadata wherein the metadata includes an indication of a name of each table of the data store, wherein the metadata includes for each table of the data store an indication of each Property of the table, and wherein the metadata includes an attribute for each property indicating whether the import data for that property should be grouped into buckets.

* * * * *